US007542619B2

(12) United States Patent
Toyooka et al.

(10) Patent No.: US 7,542,619 B2
(45) Date of Patent: Jun. 2, 2009

(54) IMAGE DISPLAY METHOD, IMAGE DISPLAY DEVICE, AND PROJECTOR

(75) Inventors: Takashi Toyooka, Suwa (JP); Shohei Yoshida, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 487 days.

(21) Appl. No.: 11/290,564

(22) Filed: Dec. 1, 2005

(65) Prior Publication Data

US 2006/0119617 A1 Jun. 8, 2006

(30) Foreign Application Priority Data

Dec. 2, 2004 (JP) ............................ 2004-349652
Dec. 2, 2004 (JP) ............................ 2004-349653
Feb. 17, 2005 (JP) ............................ 2005-040414

(51) Int. Cl.
*G06K 9/40* (2006.01)
*G09G 5/00* (2006.01)

(52) U.S. Cl. ...................................... 382/260; 345/619

(58) Field of Classification Search ....................... None
See application file for complete search history.

(56) References Cited

U.S. PATENT DOCUMENTS 5,583,575 A * 12/1996 Arita et al. .................. 348/451
5,642,170 A * 6/1997 Hackett et al. .............. 348/459
5,978,023 A * 11/1999 Glenn ........................ 348/234
6,208,382 B1 * 3/2001 Glenn ........................ 348/448
6,266,093 B1 * 7/2001 Glenn ........................ 348/448
6,985,126 B2 * 1/2006 Hoppenbrouwers et al. ... 345/60
7,027,018 B2 4/2006 Nitta et al.
7,034,453 B2 4/2006 Kai et al.
7,038,651 B2 5/2006 Nitta et al.
7,046,262 B2 * 5/2006 Feng et al. .................. 345/691
7,266,150 B2 * 9/2007 Demos .................. 375/240.15
2003/0006991 A1 * 1/2003 De Haan et al. ............. 345/473
2003/0146885 A1 * 8/2003 Hoppenbrouwers et al. ... 345/60
2004/0189680 A1 * 9/2004 Feng et al. .................. 345/691
2005/0140825 A1 6/2005 Kasahara et al.
2005/0259064 A1 11/2005 Sugino et al.
2006/0092113 A1 5/2006 Nitta et al.
2006/0158107 A1 7/2006 Kai et al.
2006/0158410 A1 7/2006 Fujine
2006/0176261 A1 8/2006 Nitta et al.

FOREIGN PATENT DOCUMENTS

CN 2535823 Y 2/2003
JP A 2002-351382 12/2002
TW 2003-005128 3/1992
TW 2004-016436 3/1992
TW 2004-002673 12/1992
TW 2003-06745 A 10/1995
WO WO 02/104005 A 12/2002

* cited by examiner

*Primary Examiner*—Jingge Wu
*Assistant Examiner*—Max Shikhman
(74) *Attorney, Agent, or Firm*—Oliff & Berridge, PLC

(57) ABSTRACT

An image display method includes dividing one frame into a plurality of sub-frames by multiplying a frame frequency of an input image signal, reducing a high-spatial frequency component of an image signal which is used for image display in at least one predetermined sub-frame among the plurality of sub-frames in comparison with that of an image signal which is used for image display in another sub-frame, and displaying an image in each sub-frame.

5 Claims, 17 Drawing Sheets

LUT

IMAGE DISPLAY METHOD, IMAGE DISPLAY DEVICE, AND PROJECTOR

CROSS-REFERENCE TO RELATED APPLICATION

This application claims priority to Japanese Patent Application No. 2004-349652, filed Dec. 2, 2004, Japanese Patent Application No. 2005-040414, filed Feb. 17, 2005, and Japanese Patent Application No. 2004-349653, filed Dec. 2, 2004, the contents of which are incorporated herein by reference.

BACKGROUND

1. Technical Field

The present invention relates to an image display method, an image display device, and a projector.

2. Related Art

An image display device such as a television displays an image in each frame. For example, at a frame frequency of 60 Hz, an image of an object is displayed at a slightly different position in each frame to produce a moving image of the movement of the object.

FIG. 14 Part A through FIG. 17 Part A show display images in each frame of a moving image of a moving object, time being represented by the vertical axis. FIG. 14 Part B through FIG. 17 Part B are views of a moving object when tracked by the line of sight.

FIG. 14 shows an image display made by a momentary-type image display device such as a CRT (Cathode Ray Tube). As shown in FIG. 14 Part A, a momentary-type image display device momentarily displays an image of the moving object in each frame (1F). Accordingly, as shown in FIG. 14 Part B, the blur 70 of the outline of the moving image decreases when tracked by the line of sight.

FIG. 15 shows an image display made by a continuous-type image display device such as a LCD (Liquid Crystal Display). As shown in FIG. 15 Part A, the continuous-type image display device continuously displays an image of the moving object during one frame. In this case, the outline position 72 of the moving object changes cyclically with a wide amplitude and, as shown in FIG. 15 Part B, the blur 70 of the outline increases when tracked by the line of sight.

In the natural world, the outline of a moving object decreases when tracked by the line of sight and appears unclear when not tracked. Visual characteristics such as those of FIG. 14 are therefore also desirable in a continuous-type image display device such as a liquid crystal display device.

As a solution, for example, JP-A-2002-351382 discloses (1) a method of intermittently displaying an image in the same manner as a momentary-type image display device in a continuous-type image display device, and (2) a method of displaying an image by doubling the frame frequency of an input image signal and inserting a generated image signal between continuous frames of input image signals.

FIG. 16 shows an intermittent image display in a continuous-type image display device. As shown in FIG. 16 Part A, a black display period is provided in each frame. As shown in FIG. 16 Part B, this reduces the blur 70 of the outline of the moving object.

FIG. 17 shows an image by inserting a generated image signal between continuous frames of input image signals. As shown in FIG. 17 Part A, an intermediate generated image signal is inserted between two continuous frames of input image signals. Consequently, there is less difference of the outline position 72 of the moving object between frames, and, as shown in FIG. 17 Part B, the blur 70 of the outline of the moving object decreases.

However, the method (1) of intermittent image display in a continuous-type image display device includes a black display period, which leads to a problem in that the image is darker than in heretofore continuous-type image display devices. The flickering image may also be painful to eyes of an observer.

The method (2) of image display by doubling the frame frequency of the input image signal and inserting a generated image signal has a problem that, since a new image signal is generated by calculating the motion vector and the like after precisely capturing the movement of the moving object, the load of the arithmetic processor greatly increases. Moreover, since an error in the generated image will cause flickering, the new image signal must be generated with high precision.

As described above, a continuous-type image display device should ideally have visual characteristics similar to those of the natural world. While the methods of (1) and (2) reduce the blur of the outline of a moving object when tracked by the line of sight, they have difficulties in solving the above problems. In each method, the outline of the moving object is visible even when not tracked by the line of sight, leading to a problem that the display is unnatural.

SUMMARY

An advantage of some aspects of the invention is to suppress an increase in the signal processing load while also suppressing the blur of the displayed image. Another advantage of some aspects of the invention is to provide an image display method which can achieve visual characteristics similar to those of the natural world, and an image display method and a projector which obtain excellent display quality.

According to an aspect of the invention, the image display method includes dividing one frame into a plurality of sub-frames by multiplying a frame frequency of an input image signal, and displaying an image in each sub-frame. In at least one predetermined sub-frame among the plurality of sub-frames, the high-spatial frequency component of an image signal which is used for image display is reduced in comparison with that of an image signal which is used for image display in another sub-frame.

According to the image display method of this invention, the high-spatial frequency component of an image signal which is used for image display in at least one predetermined sub-frame among the plurality of sub-frames, this is reduced in comparison with that of an image signal which is used for image display in another sub-frame. Therefore, the outline of the image which is displayed in the predetermined sub-frame can be blurred. That is, when a plurality of frames is continuously displayed, an image with a blurred outline is intermittently displayed.

The human brain processes image light which is incident on the eye by dividing it into a luminance component and a color difference component. Of these, it is thought that the luminance component broadly relates to perception of outline and movement, while the color difference component broadly relates to perception of color and surface texture.

Accordingly, by intermittently displaying an image with a blurred outline as in the image display method of this invention, it is possible to achieve the same effect as when intermittently displaying a black display (i.e., to reduce the blur when the moving object is tracked by the line of sight) while suppressing overall luminance reduction in one frame. When displaying an image with a blurred outline, the high-spatial frequency component of the image signal input for one frame which the sub-frame belongs is reduced, and the image is displayed using this image signal. Therefore, since there is no need to precisely capture the movement of the moving object in the display image and generate a new image signal by calculating a motion vector and so on, it is possible to suppress an increase in the signal processing load more successfully than in conventional image display devices.

Therefore, according to the image display method of this invention, in a continuous-type image display device, it is possible to suppress an increase in the signal processing load while suppressing the blur of the displayed image.

Preferably in the image display method of this invention, a high-spatial frequency component of an image signal used for image display in a sub-frame which is different from the predetermined sub-frame should be increased in accordance with the amount of reduction in the above high-spatial frequency component.

When the outline of the image displayed in one sub-frame is blurred by reducing the high-spatial frequency component in the manner described above, the luminance in one whole frame decreases slightly, although not as much as when a black display is intermittently displayed. Accordingly, by increasing a high-spatial frequency component of an image signal used for image display in a sub-frame which is different from that of the predetermined sub-frame in accordance with the amount of reduction in the high-spatial frequency component, the luminance of the image in the different sub-frame increases, thereby preventing a reduction in the luminance of the entire frame.

More specifically, the high-spatial frequency component can be reduced by processing the image signal used for image display in the predetermined sub-frame using a low-pass filter.

The image display method of this invention includes multiplying a frame frequency of an image signal, generating a new image signal in an increased frame, and displaying an image by using the input image signal and the generated image signal. Preferably, the generated image signal is one wherein the high-spatial frequency component of the image signal is reduced.

Since the image is displayed continuously in this configuration, the brightness of the image not be decreased. Also, the outline of the image can be blurred by reducing the high-spatial frequency component of the image signal. When image display is executed by inserting the image having a blurred outline between the increased frames, the blur of the outline when a moving object is tracked by the line of sight can be reduced. When not tracked by the line of sight, the outline appears to be blurred. Therefore, visual characteristics similar to those of the natural world can be obtained.

The generated image signal should preferably be generated by processing using a low-pass filter.

According to this configuration, a generated image signal with a reduced high-spatial frequency component can be easily generated.

The image display method may further includes generating a primary intermediate image signal by calculating the linear sum of the continuous frames of input image signals in accordance with the number of frames between them, and generating the generated image signal by processing the primary intermediate image signal using a low-pass filter.

According to this configuration, by reducing the high-spatial frequency component of the image signal in the changed regions of the continuous frames of input image signals, a generated image signal having continuity between the input image signals before and behind it can be generated by a simple algorithm. Therefore, visual characteristics similar to those of the natural world can be obtained.

The generated image signal should preferably include unaltered image signals in unchanged regions of the image signals before and behind it.

According to this configuration, the outline of a still is can be maintained without blurring. Furthermore, since the outline of the motion image is blurred no more than necessary, blur in the outline of a moving object can be suppressed. Therefore, visual characteristics similar to those of the natural world can be obtained.

The image display method of this invention may also include generating a secondary intermediate image signal wherein the high-spatial frequency component of the image signal has been reduced in changed regions of the continuous frames of input image signals, generating a third intermediate image signal by extracting only the secondary intermediate image signal which corresponds to the changed regions, generating a common image signal by extracting only the image signals in the unchanged regions of the continuous frames of input image signals, and generating the generated image signal by synthesizing the third intermediate image signal with the common image signal.

According to this configuration, the generated image signal can be generated with a simple process.

Preferably, the generated image signal should be generated by determining the application rate of an image signal whose high-spatial frequency component has been reduced based on the difference between the continuous frames of input image signals.

Specifically, the image display method should preferably include generating a primary intermediate image signal by calculating the linear sum of the continuous frames of input image signals in accordance with the number of frames between them, generating the secondary intermediate image signal by processing the primary intermediate image signal using a low-pass filter, determining the application rate of the secondary intermediate image signal based on the difference between the continuous frames of input image signals, and generating the generated image signal by synthesizing the input image signal or the primary intermediate image signal with the secondary intermediate image signal in accordance with the determined application rate.

According to this configuration, it is possible to generate a generated image signal which continuously changes from the region of considerable difference between the input image signals to a region of little difference. Therefore, visual characteristics similar to those of the natural world can be obtained.

The application rate of the secondary intermediate image signal should preferably be determined by referring to a table of the relationship between the difference between the continuous frames of input image signals and the application rate of the secondary intermediate image signal.

According to this configuration, the application rate of the primary intermediate image signal can be determined simply and uniformly.

Preferably, in determining the application rate of the secondary intermediate image signal, a first mask, which increases the application rate of the secondary intermediate image signal in proportion to the amount of the calculated difference, is generated, and a second mask, which increases the application rate of the input image signal or the primary intermediate image signal in inverse proportion to the amount of the calculated difference, is generated.

In addition, in generating the generated image signal, a third intermediate image signal is generated by processing the primary intermediate image signal in the first mask, a fourth intermediate image signal is generated by processing the input image signal or the primary intermediate image signal in the second mask, and the generated image signal is generated by synthesizing the third intermediate image signal and the fourth intermediate image signal.

According to this configuration, when the signal level of a continuous still image signal varies slightly due to noise and the like, the generated image signal is generated after reducing the application rate of the secondary intermediate image signal which has a reduced high-spatial frequency component and increasing the application rates of the input image signal and the primary intermediate image signal. This prevents considerable blurring in the outline of the still image and enables it to be displayed accurately.

Preferably, the second mask, which states the application rate of the input image signal and the primary intermediate image signal, should be generated by inverting the first mask which states the application rate of the secondary intermediate image signal.

This configuration enables the second mask to be generated easily.

In determining the application rate of the secondary intermediate image signal, the difference between the continuous frames of input image signals should preferably be calculated by comparing brightness information which is extracted from them.

According to this configuration, the difference between input image signals of different colors for color image display can be calculated uniquely. Therefore, the application rate of the secondary intermediate image signal can be prevented from varying from color to color.

It is also preferable that the methods include extracting brightness information of the input image signals beforehand, generating brightness information of the generated image signal based on the extracted brightness information of the input image signals, and generating the generated image signal by synthesizing the generated brightness information of the generated image signal with color information of the input image signals.

This configuration prevents the application rate of an image signal whose high-spatial frequency component has been reduced from varying from color to color. It also becomes possible to commoditize the generator of the generated image signal with regard to input image signals of different colors which are used for color image display, enabling the manufacturing cost to be reduced.

The brightness information should preferably consist of luminance information.

According to this configuration, it is possible to simulate the human visual characteristic whereby the outline of an image is perceived by its luminance information, and thereby achieve a natural image display.

An image display device of this invention includes a frame converter which divides one frame into a plurality of sub-frames by multiplying a frame frequency of an input image signal, a display device which displays an image in each sub-frame divided by the frame converter, and a high-spatial frequency component reducing unit which reduces a high-spatial frequency component of an image signal which is used for image display in at least one predetermined sub-frame among the plurality of sub-frames.

According to the image display device of this invention, the same effects as the image display method described above are obtained.

The image display device may further include a high-spatial frequency component increasing unit which increases a high-spatial frequency component of an image signal used for image display in a sub-frame which is different from the predetermined sub-frame in accordance with the amount of reduction in the high-spatial frequency component by the high-spatial frequency component reducing unit.

By using such a configuration, the luminance of an image in different sub-frames can be increased, and the luminance of the entire frame can be prevented from decreasing.

More specifically, in the image display device of this invention, a low-pass filter can be used as the high-spatial frequency component reducing unit.

The image display device of this invention display an image by using the image display method described above.

According to this configuration, it is possible to display an image with visual characteristics similar to those of the natural world, and to provide an image display device having excellent display quality.

A projector of this invention includes the image display device described above.

According to the image display device of this invention, in a continuous-type image display device, the signal processing load can be prevented from increasing while suppressing the blur of the displayed image. Therefore, the projector of this invention can achieve excellent display characteristics.

DESCRIPTION OF EXEMPLARY EMBODIMENTS

DETAILED DESCRIPTION OF THE INVENTION

Preferred embodiments of an image display method, an image display device, and a projector according to this invention will be explained with reference to the drawings.

While the following embodiments describe an example of image display where the frame frequency of an input image signal is doubled, the frame frequency may be multiplied by any integer of three or more.

FIRST EMBODIMENT

Image Display Device

Figure 1:
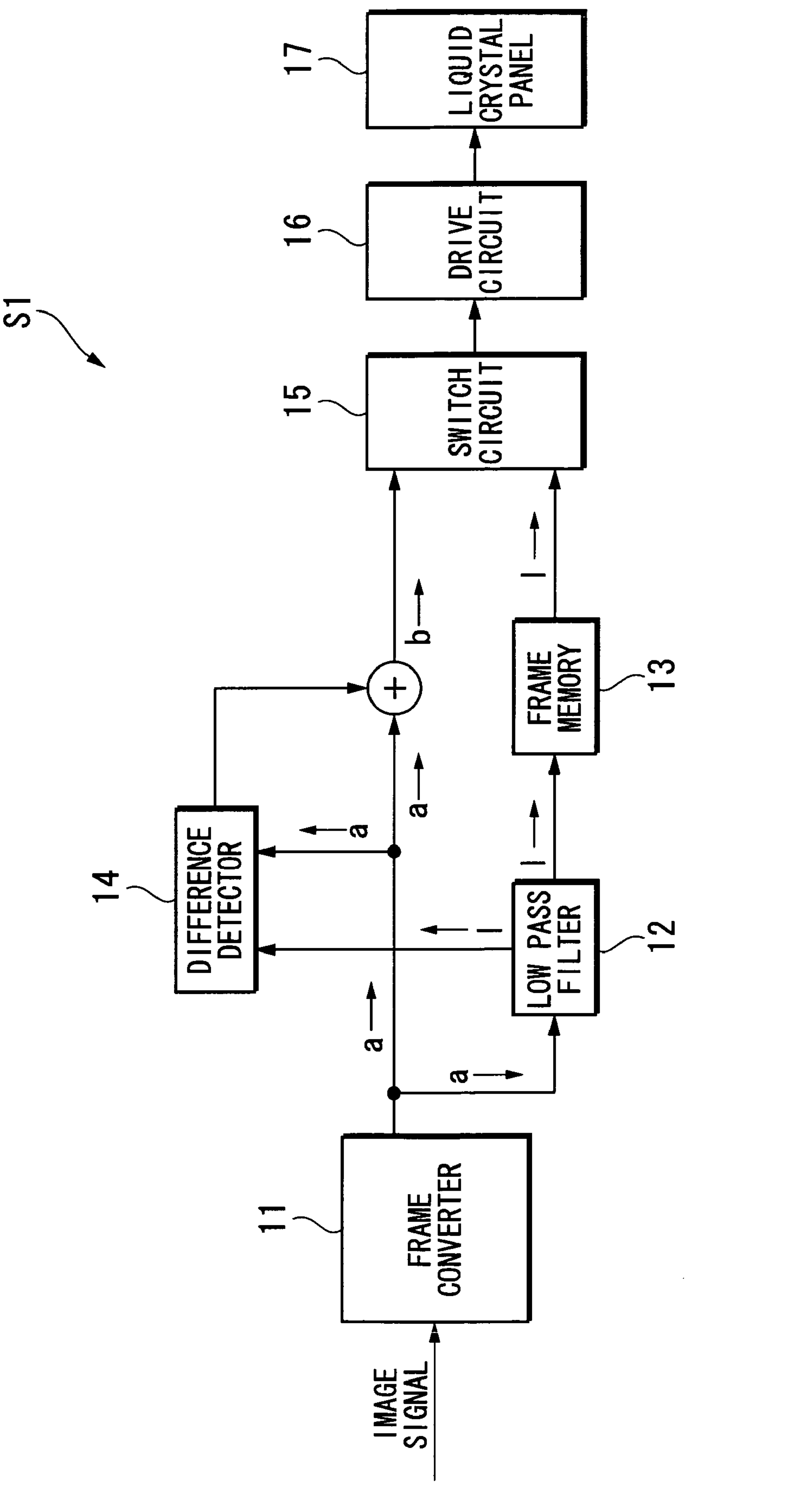
FIG. 1 is a functional block diagram showing an image display device according to a first embodiment of this invention.

FIG. 1 is a block diagram of the functional configuration showing an image display device S1 according to a first embodiment. As shown in FIG. 1, the image display device S1 of this invention includes a frame converter 11, a low-pass filter 12 (high-spatial frequency component reducing unit), a frame memory 13, a difference detector 14 (high-spatial frequency component increasing unit), a switch circuit 15, a drive circuit 16, and a liquid crystal panel 17.

The frame converter 11 divides one frame into two sub-frames by doubling (e.g., to 120 Hz) the frame frequency (e.g., 60 Hz) of an image signal which is input thereto from the outside. In the following explanation, an image signal which has been frame converted by the frame converter 11, i.e., an image signal which is output from the frame converter 11, is termed an original signal "a".

The low-pass filter 12, which is connected to the frame converter 11, reduces the high-spatial frequency component of the original signal "a" and outputs an original signal "a" having a reduced high-spatial frequency component as an outline elimination signal 1.

The difference detector 14, which is connected to the frame converter 11 and the low-pass filter 12, calculates the difference between the original signal "a" input from the frame converter 11 and the original signal "a" input from the low-pass filter 12, and adds the calculated different to the original signal "a". In the following explanation, the original signal "a" which is obtained by adding the difference between the original signal "a" and the outline elimination signal 1 is termed an outline emphasis signal "b".

The frame memory 13 is connected to the low-pass filter 12, and outputs the outline elimination signal 1 input from the low-pass filter 12 after storing it for a fixed period of time. The period of time for storing the outline elimination signal 1 in the frame memory 13 is set such that the time at which the outline elimination signal 1 is input to the switch circuit 15 is synchronized with the time at which the outline emphasis signal "b" is input to the switch circuit 15.

The switch circuit 15 outputs the outline elimination signal 1 and the outline emphasis signal "b" alternately in each sub-frame.

The drive circuit 16 drives the liquid crystal panel 17 based on the outline elimination signal 1 and the outline emphasis signal "b" which are input thereto, and includes a semiconductor IC chip which is directly mounted on the liquid crystal panel 17, a semiconductor IC chip which is mounted on a circuit board conductively connected to the liquid crystal panel 17, or such like.

The liquid crystal panel 17 is a continuous-type image display device which, when driven by the drive circuit 16, displays an image.

Image Display Method

Subsequently, the operation (image display method) of the image display device S1 in the embodiment configured as above will be explained.

An image signal input to the frame converter 11 is frame-converted, and the frame converter 11 outputs an original signal "a" whose frame frequency has been doubled. The image signal output from the frame converter 11 is then split in two, and one of the original signals "a" is input to the low-pass filter 12.

The low-pass filter 12 reduces the high-spatial frequency component of the original signal which is input thereto and outputs it as an outline elimination signal, which is then input to the frame memory 13 and the difference detector 14. When the outline elimination signal 1 having a reduced high-spatial frequency component is input to the drive circuit 16, the outline of the image displayed on the liquid crystal panel 17 is more blurred than one displayed on the liquid crystal panel 17 by inputting the original signal "a" to the drive circuit 16.

The other original signal "a" is once more split in two signals, one of which is input to the difference detector 14. The difference detector 14 detects the difference between the original signals "a" and the outline elimination signal 1, and adds this difference to the original signal "a". The original signal "a" which the difference has been added to be input to the switch circuit 15 as an outline emphasis signal "b". When the outline emphasis signal "b" is input to the drive circuit 16, the outline of the image displayed on the liquid crystal panel 17 is more emphasized than one displayed on the liquid crystal panel 17 by inputting the original signal "a" to the drive circuit 16. The outline elimination signal 1 is input to the frame memory 13 and stored therein before being input to the switch circuit 15 in synchronism with the timing of inputting the outline emphasis signal "b" to the switch circuit 15.

The outline elimination signal 1 and the outline emphasis signal "b" which are input to the switch circuit 15 are output alternately in sub-frame units by the switch circuit 15 and input to the drive circuit 16. Therefore, according to the image display device of this embodiment, an image having a blurred outline and an image having an emphasized outline are displayed alternately on the liquid crystal panel 17.

Figure 2:
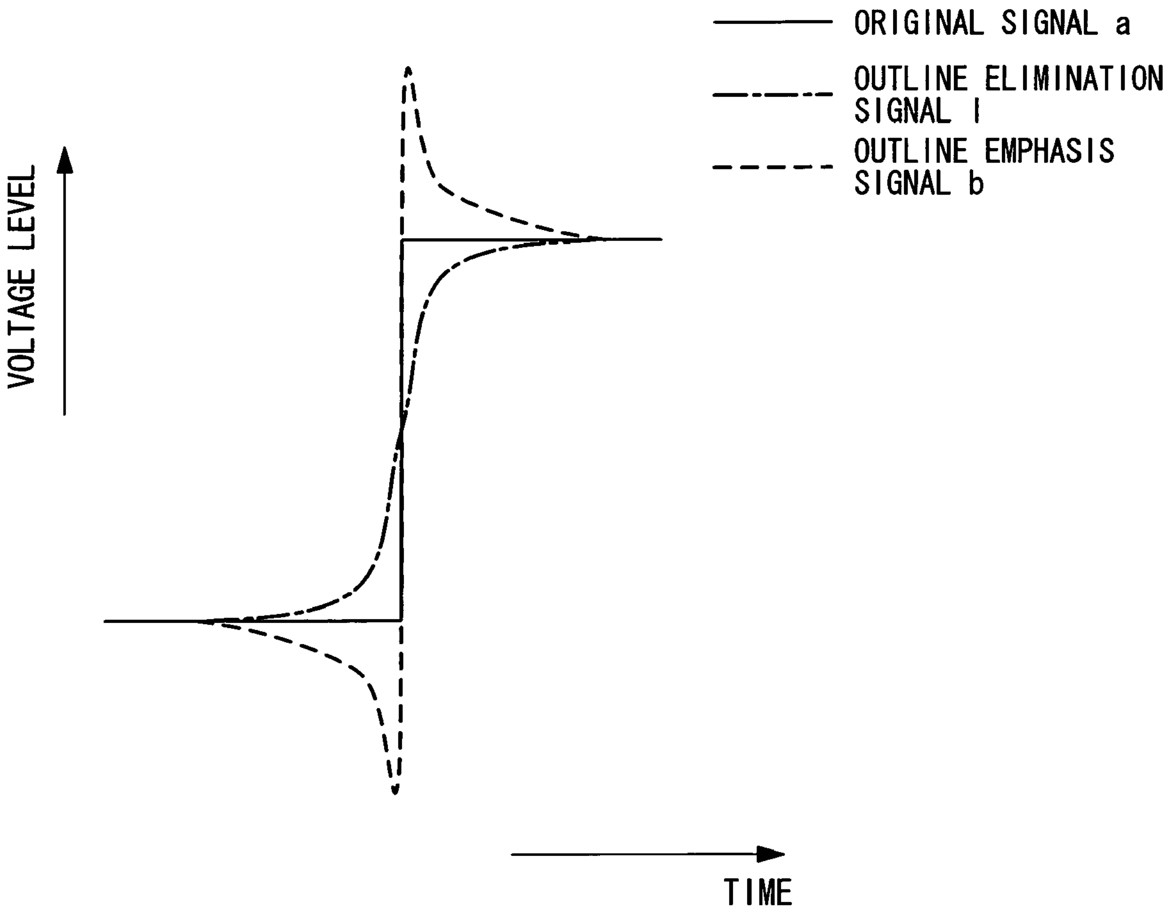
FIG. 2 is a waveform diagram for explanation showing an outline elimination signal and an outline emphasis signal.

This will be explained with reference to FIG. 2. In FIG. 2, the horizontal axis represents time and the vertical axis represents the voltage level of the signal.

As shown in the waveform diagram of FIG. 2, an image based on the outline elimination signal 1 obtained by reducing the high-spatial frequency component of the original signal a, and an image based on the outline emphasis signal "b" obtained by adding the high-spatial frequency component (difference) to the original signal a, are displayed alternately. Therefore, when a plurality of frames is displayed continuously on the liquid crystal panel 17, an image with a blurred outline is displayed in a predetermined sub-frame (when the outline elimination signal 1 is output from the switch circuit 15), the result being that an image with a blurred outline is displayed intermittently.

As already mentioned, the human brain processes image light which is incident upon the eye by dividing it into a luminance component and a color difference component. Of these, it is thought that the luminance component broadly relates to perception of outline and movement, while the color difference component broadly relates to color and surface texture. Accordingly, by intermittently displaying an image with a blurred outline as in the image display device and method of this embodiment, it is possible to achieve the same effect as when intermittently displaying a black display (i.e., to reduce the blur when the moving object is tracked by the line of sight) while suppressing overall luminance reduction in one frame.

In the image display device and method of this embodiment, the low-pass filter 12 processes the original signal "a" and generates the outline elimination signal 1, which is input to the drive circuit 16 to display an image with a blurred outline. Therefore, since there is no need to precisely capture the movement of the moving object in the display image and generate a new image signal by calculating a motion vector and so on, it is possible to suppress an increase in the signal processing load more successfully than in conventional image display devices.

Therefore, according to the image display device and method of this embodiment, in a continuous-type image display device, it is possible to suppress an increase in the signal processing load while suppressing the blur of the displayed image.

Furthermore, according to the image display device and method of this embodiment, the difference detector 14 detects the difference (amount of reduction in the high-spatial frequency component) between the original signal "a" and the outline elimination signal 1, and the outline emphasis signal "b" obtained by adding this difference to the original signal "a" is input to the switch circuit 15 alternately with the outline elimination signal 1. Therefore, an image with an emphasized outline is displayed in a different sub-frame (predetermined sub-frame) than the sub-frame which an image with a blurred outline is displayed in.

Displaying an image whose outline is reduced to less than that of the original image is equivalent to reducing the luminance of the screen. Displaying an image whose outline is more emphasized than that of the original image is equivalent to increasing the luminance of the screen. Therefore, when an image with a blurred outline is intermittently displayed, the luminance decreases slightly, although not as much as when a black display is intermittently displayed. Accordingly, by displaying an image with an emphasized outline in a different sub-frame to that which the image with a blurred outline is displayed in as in the image display device and method of this embodiment, it is possible to prevent a reduction in the overall luminance of one frame, and thereby obtain superior display characteristics.

There is a possibility that the number of gradation stages of the image displayed by the outline emphasis signal "b" will exceed the maximum number of gradation stages of the liquid crystal panel 17. In this case, if suppressing the blur of the displayed image is the first priority, the image displayed by the outline emphasis signal "b" should be displayed in the maximum gradation stage. On the other hand, if obtaining an image without breakup is the first priority, the amount of reduction in the high-spatial frequency component of the original signal "a" should be adjusted to reduce the difference between the original signal "a" and the outline elimination signal 1, so that the number of gradation stages of the image displayed by the outline emphasis signal "b" is less than the maximum number of gradation stages.

Switching in such cases may be executed by providing a switch or the like which is operated by the viewer himself in accordance with his own preferences, or executed automatically within the image display device.

Figure 3:
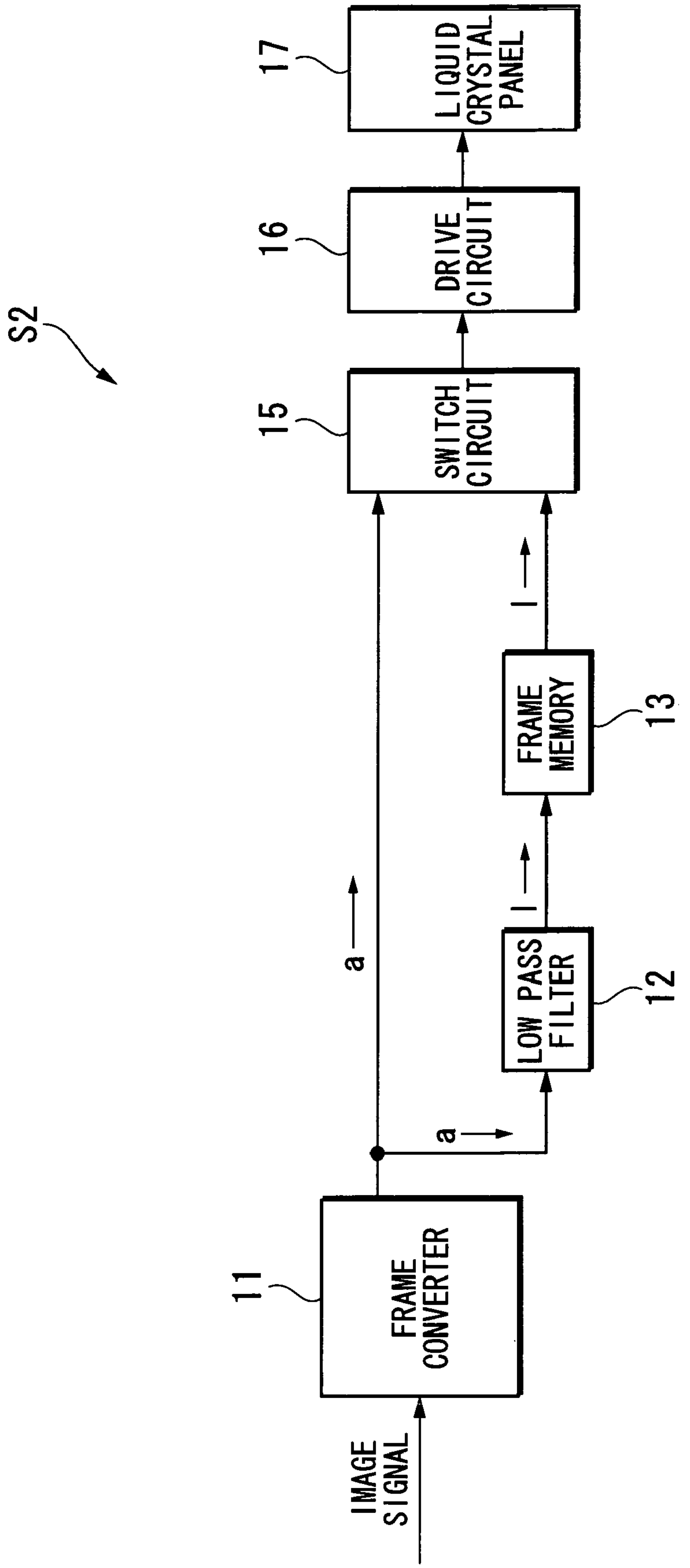
FIG. 3 is a functional block diagram showing an image display device according to another embodiment of this invention.

A configuration such as that shown in FIG. 3 can be used to further reduce the signal processing load.

An image display device S2 shown in FIG. 3 does not include the difference detector 14 provided in the image display device S1 shown in FIG. 1, the original signal "a" and the outline elimination signal 1 being input directly to the switch circuit 15.

According to the image display device S2 having this configuration, an image based on the original signal "a" and an image based on the outline elimination signal 1 are alternately displayed in sub-frame units.

According to the image display device S2, since there is no outline emphasis signal "b", although the luminance in one frame decreases slightly as described above, the signal processing load can be reduced further.

When the image display devices S1 and S2 of the embodiment described above are installed in, for example, a three-plate projector, and the liquid crystal panel 17 is used as a light valve, a liquid crystal panel is provided for each of the colors RGB. Accordingly, three each of the frame converter 11, the low-pass filter 12, the frame memory 13, and the difference detector 14 (when the image display device S1 is installed) must be provided. When, for example, a YCbCr signal is input to the image display device as an image signal from the outside, this YCbCr signal is converted to an RGB signal before being input to respective frame converters.

Accordingly, the configuration should preferably be such that, when a YCbCr signal is input to the image display device from the outside, before being converted to an RGB signal, the YCbCr signal is input directly to the frame converter 11 in the image display device S1 or S2 of the above embodiment, and the outline elimination signal 1 thereby generated and the outline emphasis signal "b" (original signal "a" in the case of the image display device S2) are converted to RGB signals. Thereafter, the switch circuit allocates an R signal, a G signal, and a B signal to a drive circuit of each liquid crystal panel.

According to this configuration, only one each of the frame converter 11, the low-pass filter 12, the frame memory 13, and the difference detector 14 (when the image display device S1 is installed) need be provided, enabling the configuration of the device to be simplified.

SECOND EMBODIMENT

Image Display Device

FIG. 2 is a block diagram showing an image display device according to a second embodiment.

The image display device according to this embodiment mainly includes a liquid crystal device 100 and a display controller 290. The liquid crystal device 100 includes a drive circuit 110D which drives a liquid crystal panel 110. The drive circuit 110D includes a semiconductor IC chip which is mounted directly on the liquid crystal panel 110, a semiconductor IC chip which is mounted on a circuit board conductively connected to the liquid crystal panel 110, or such like. The drive circuit 110D includes a scanning line drive circuit, a signal line drive circuit, and a check circuit.

The display controller 290 mainly includes a display information output source 291, a display information processor 292, and a timing generator 294.

The display information output source 291 includes a memory consisting of a read only memory (ROM), a random access memory (RAM), or the like, a storage unit consisting of a magnetic recording disk, an optical recording disk, or the like, and a tuning circuit which outputs a tuned digital image signal. Based on various types of clock signals generated by the timing generator 294, the display information output source 291 supplies display information to the display information processor 292 as an image signal in a predetermined format.

The display information processor 292 includes various types of conventionally known circuits such as a serial-to-parallel converter, an amplification/inversion circuit, a rotation circuit, a gamma corrector, and a clamping circuit. The display information processor 292 executes various types of processes to an image signal which is input thereto, and supplies the image signal together with a clock signal CLK to the drive circuit 10D. A power source 293 supplies a predetermined voltage to each of the constituent parts mentioned above.

Figure 5:
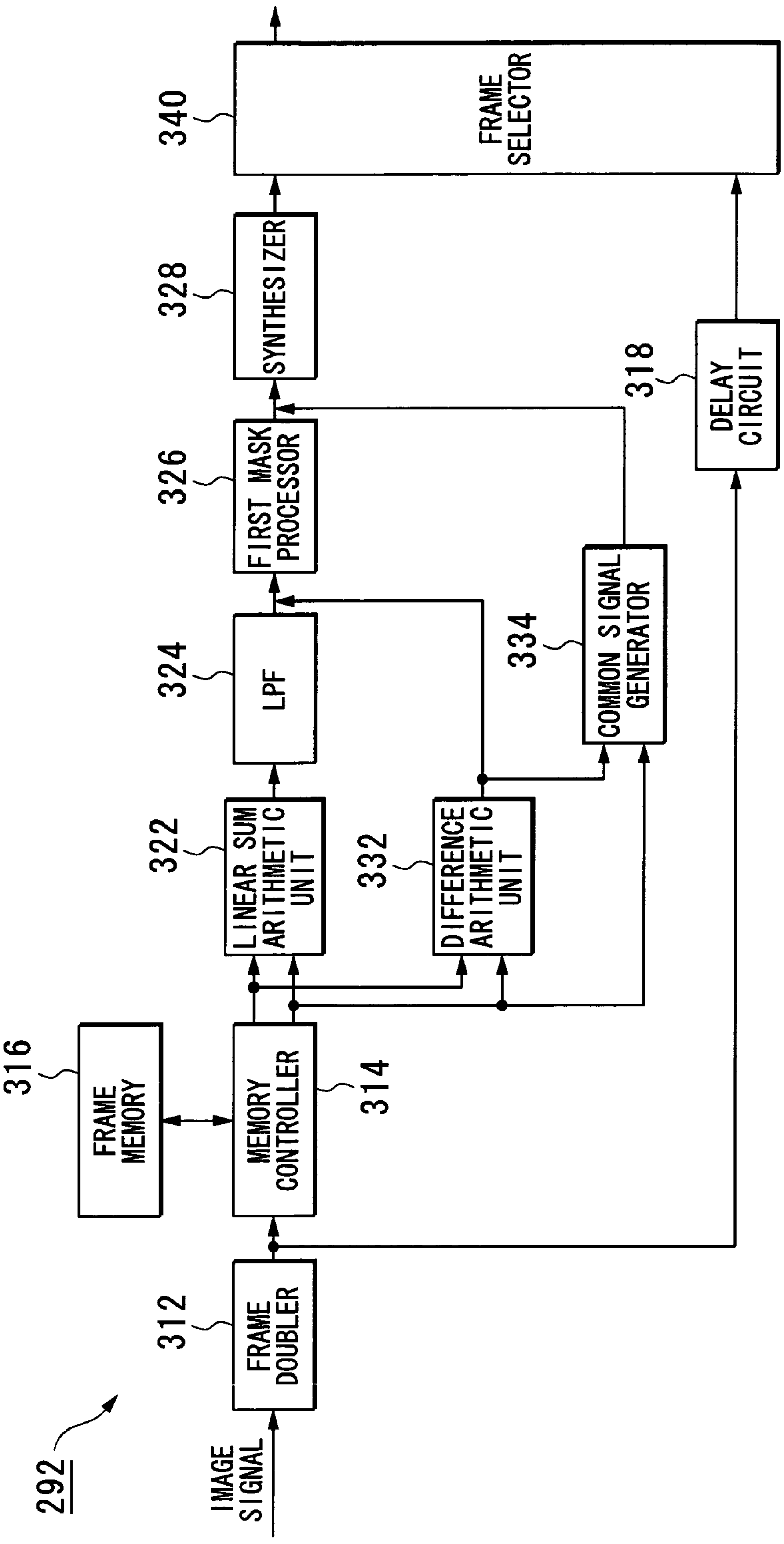
FIG. 5 is a block diagram showing a processor according to the second embodiment of this invention.

FIG. 5 is a block diagram showing a processor according to the second embodiment. Only the parts of the processor which are characteristic of this invention are depicted.

An input image signal is input to a frame doubler 312. The frame doubler 312 doubles the frame frequency of the input image signal. A converting unit for multiplying the frame frequency by an integer of three of more can be provided instead of this frame doubler 312.

A memory controller 314 is connected to the frame doubler 312. In this embodiment, since a generated image signal is generated from continuously input image signals, the first signal must be stored until a subsequent input image signal is input. Accordingly, a frame memory 316 is connected to the memory controller 314. This enables the memory controller 314 to write the first input image signal which is input from the frame doubler 312 into the frame memory 316, and read this first input image signal from the frame memory 316 at the point when the subsequent input image signal is input. The continuous frames of input image signals can thus be output simultaneously from the memory controller 314.

A linear sum arithmetic unit 322, a low-pass filter (LPF) 324, a mask processor 326, and a synthesizer 328, are sequentially connected to the memory controller 314.

The linear sum arithmetic unit 322 calculates the linear sum of the continuous frames of input image signal and generates a primary intermediate image signal. Since the frame frequency is doubled in this embodiment, the primary intermediate image signal is generated by averaging the continuous frames of input image signal.

The LPF 324 cuts the high-spatial frequency band of the primary intermediate image signal and generates a secondary intermediate image signal. Cutting the high-spatial frequency band makes it possible to sharpen the outline component of the image signal and blur the contrast boundary of the image. A band-pass filter which cuts the high-spatial frequency band may be used as the LPF 324.

A difference arithmetic unit 332 is connected to the memory controller 314 mentioned above. The difference arithmetic unit 332 executes a difference operation to the continuous frames of input image signal so as to acquire the portion where the difference exists, and generates a first mask (filter) which transmits only the portion of the image signal where the difference exists.

The difference arithmetic unit 332 connects to a mask processor 326. The mask processor 326 uses the first mask input from the difference arithmetic unit 332 to process a secondary intermediate image signal which is input from the LPF 324, and thereby generates a third intermediate image signal.

A common signal generator 334 is connected to the memory controller 314 and the difference arithmetic unit 332. The common signal generator 334 inverts the transmission/non-transmission of the first mask input from the difference arithmetic unit 332, and generates a second mask (filter) which transmits only the portion of the image signal where there is no difference of the continuous frames of input image signal. The common signal generator 334 also processes the image signal input from the memory controller 314 and generates a common image signal.

The common signal generator 334 connects to the synthesizer 328. The synthesizer 328 synthesizes the third intermediate image signal input from the mask processor 326 with the common image signal input from the common signal generator 334, generating a final generated image signal.

A frame selector 340 is connected to the synthesizer 328, and the generated image signal is input to this frame selector 340. The frame doubler 312 mentioned above is connected to the frame selector 340 via a delay circuit 318. The delay circuit 318 delays the output timing of each input image signal in accordance with the time taken to generate the generated image signal, and then outputs each input image signal to the frame selector 340.

The frame selector 340 inserts the generated image signal between continuous frames of input image signals in compliance with the doubled frame frequency. The image signals are then output sequentially at predetermined timings to the drive circuit of the liquid crystal device.

Image Display Method

Subsequently, an image display method which uses the image display device will be explained.

Figure 6:
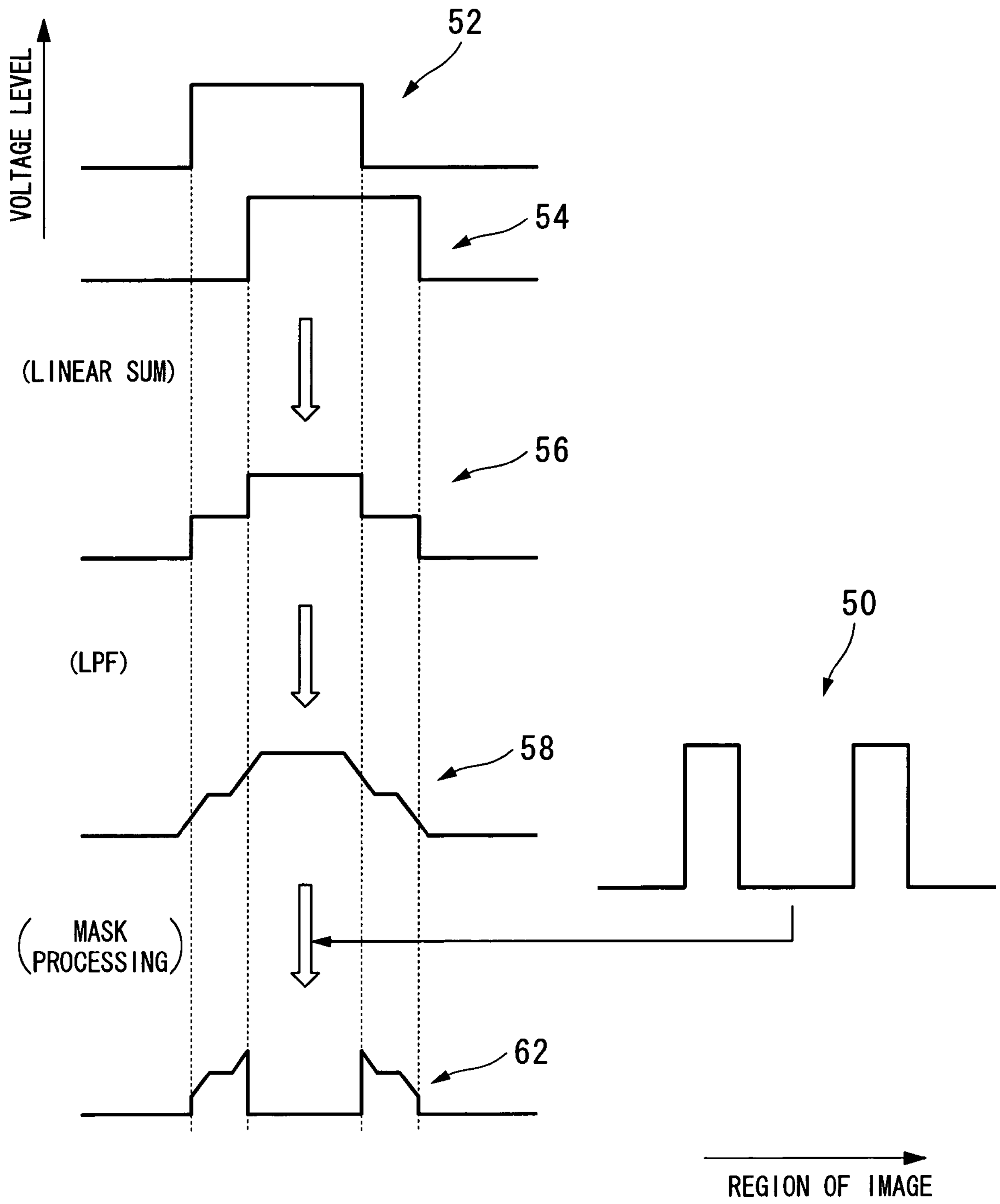
FIG. 6 is an explanatory diagram showing an image display method according to the second embodiment of this invention.
Figure 7:
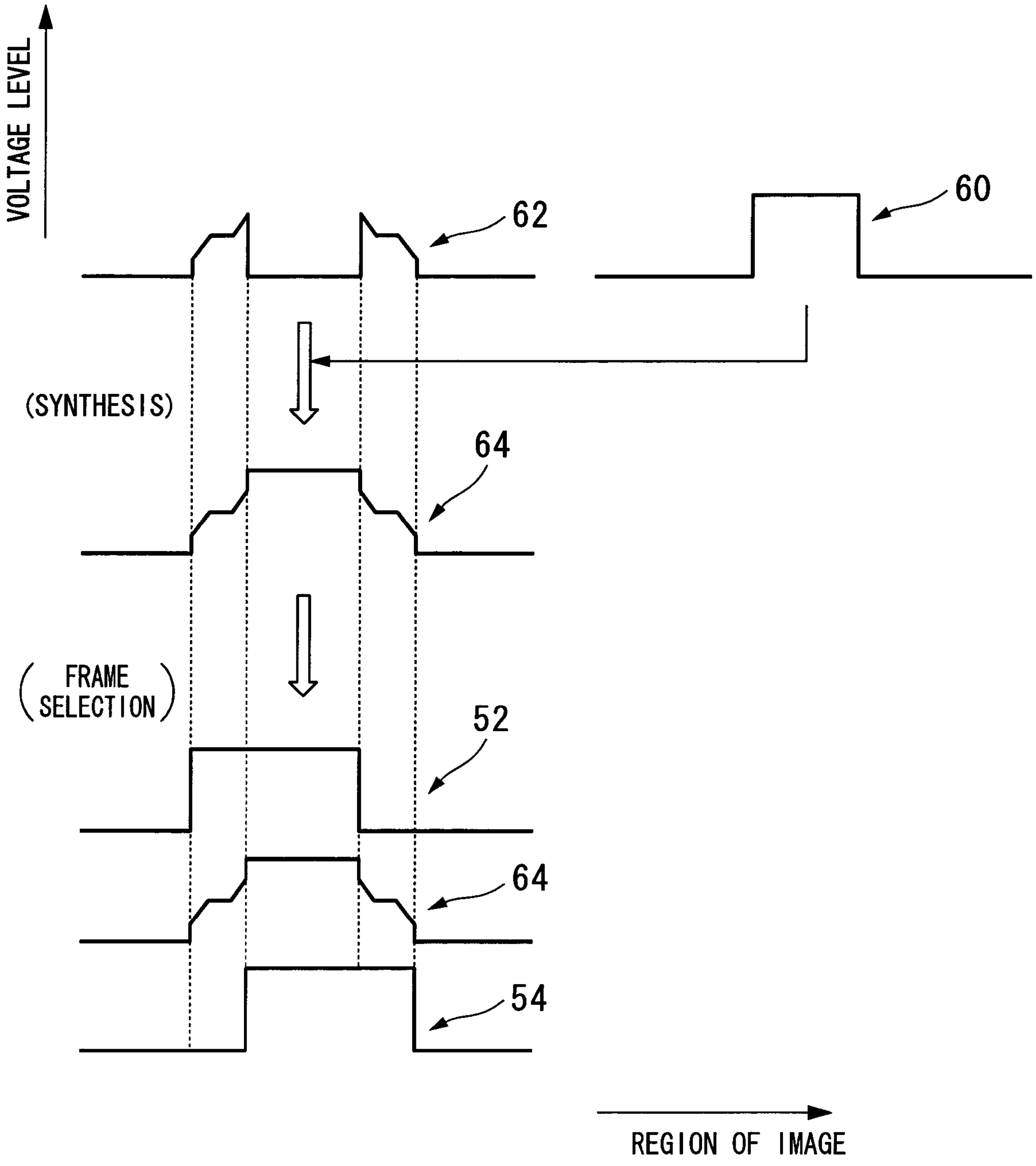
FIG. 7 is an explanatory diagram showing an image display method according to the second embodiment of this invention.

FIGS. 6 and 7 are explanatory diagrams showing an image display method according to this invention. FIGS. 6 and 7 depict the image signal generated in each step, the horizontal axis representing regions of the image and the vertical axis representing the voltage level of the signal. When the voltage level is at the low level, a black image is displayed, and when the voltage level is at the high level, a white image is displayed. Intermediate gradation stages are displayed at intermediate levels between these levels.

Input image signals 52 and 54 shown in FIG. 6 are continuously input to the frame doubler 312 of FIG. 5. The continuous frames of input image signals 52 and 54 are image signals for moving images, the high level region of the later input image signal 54 deviating to the right side of the high level region of the earlier input image signal 52. These image signals display an image of a white moving object which moves from the left to the right on a black screen.

Returning to FIG. 5, the input image signals are input to the frame doubler 312 and sequentially output to the delay circuit 318. The delay circuit 318 delays the output timings of the input image signals in accordance with the time taken to generate the generated image signals, and outputs the input image signals to the frame selector 340.

The input image signals which are input to the frame doubler 312 are sequentially output to the memory controller 314. When the earlier of the continuous frames of input image signals is input to the memory controller 314, the memory controller 314 writes this input image signal to the frame memory 316. When the later of the continuous frames of input image signals is input to the memory controller 314, the memory controller 314 reads the earlier image signal from the frame memory 316. The memory controller 314 then simultaneously outputs the continuous frames of input image signals to the linear sum arithmetic unit 322 and the difference arithmetic unit 332. In order to generate the next generated image signal, the later of the image signals is overwritten in the frame memory 316.

Returning to FIG. 6, the linear sum arithmetic unit 322 uses the input image signals 52 and 54 to generate a primary intermediate image signal 56. Since the frame frequency is doubled in this embodiment, one frame is added between the continuous frames of input image signals 52 and 54 and one generated image signal should be generated. Accordingly, the primary intermediate image signal 56 is generated by executing a linear sum operation of averaging the continuous frames of input image signals 52 and 54.

Incidentally, when the frame frequency is multiplied by an integer of three or more and a plurality of intermediate image signals is generated between the continuous frames of input image signals 52 and 54, the plurality of primary intermediate image signals 56 is generated after calculating the linear sum of the continuous frames of input image signals 52 and 54. This makes it possible to generate the primary intermediate image signals 56 having continuity between the earlier and later input image signals 52 and 54 by a simple algorithm.

The primary intermediate image signal 56 passes the LPF 324, generating a secondary intermediate image signal 58. Generally, the region of one image signal where the level changes constitutes the contrast boundary in the image and forms its outline. The outline of the image is sharper when the level of the image signal changes abruptly, and is blurred when the level of the image signal changes slowly. The portion of the image signal where the level changes abruptly contains many high-spatial frequency components, while the portion where the level changes slowly contains few high-spatial frequency components.

Accordingly, when the primary intermediate image signal 56 passes through the LPF, the high-spatial frequency components in the portion where the level changes abruptly are cut, generating the secondary intermediate image signal 58 which has a slow level change. The secondary intermediate image signal 58 can be generated easily by passing the primary intermediate image signal 56 through the LPF.

However, when slowing the level change, the level change is slowed even in the unchanged regions of voltage levels of the continuous frames of input image signals 52 and 54 (regions where there is no difference, or regions where the difference is below a predetermined threshold undetectable by the human eye, equivalent to there being no difference). In this case, the outline of a still image becomes blurred.

In the secondary intermediate image signal 58 shown in FIG. 6, the effect of slowing the level change in the changed regions of the voltage levels of the continuous frames of input image signals 52 and 54 (the regions where there is difference) extends to the adjacent unchanged regions. If this secondary intermediate image signal 58 is used as the final generated image signal, the outline of the moving image will be more blurred than necessary, increasing the blur of the outline.

Accordingly, the difference arithmetic unit generates a first mask (filter) 50 which transmits only the changed regions of the continuous frames of input image using the continuous frames of input image signals 52 and 54 and acquiring a region where there is a significant difference.

Next, the mask processor passes the secondary intermediate image signal 58 through the first mask 50 and extracts only the parts of secondary intermediate image signal 58 which correspond to the changed regions of the continuous frames of input image signals 52 and 54. Thus a third intermediate image signal 62 is generated.

The common signal generator extracts only the image signals in the unchanged regions of the continuous frames of input image signals 52 and 54, and generates a common image signal 60 shown in FIG. 7. The common image signal 60 is generated by inverting the transmission/non-transmission of the first mask, and then forming a second mask (filter) which transmits only the unchanged regions of the continuous frames of input image signals. Next, the image signal is passed through the second mask to generate the common image signal 60. Any one of the input image signals which are output from the memory controller may be passed to the second mask.

The synthesizer synthesizes the third intermediate image signal 62 and the common image signal 60. This generates a final generated image signal 64.

Since the generated image signal 64 generated in this manner includes the unaltered image signals in the unchanged regions of the continuous frames of input image signals 52 and 54, the outline of a still image can be maintained without blurring. The blur of the outline of a moving image can also be suppressed, since the outline of the moving image does not blur unnecessarily.

The generated image signal 64 is output to a frame selector. The frame selector inserts the generated image signal 64 between the continuous frames of input image signals 52 and 54 in compliance with the doubled frame frequency. The image signals are then output sequentially to the driver circuit of the liquid crystal device at predetermined timings. This enables the image to be displayed.

Figure 8:
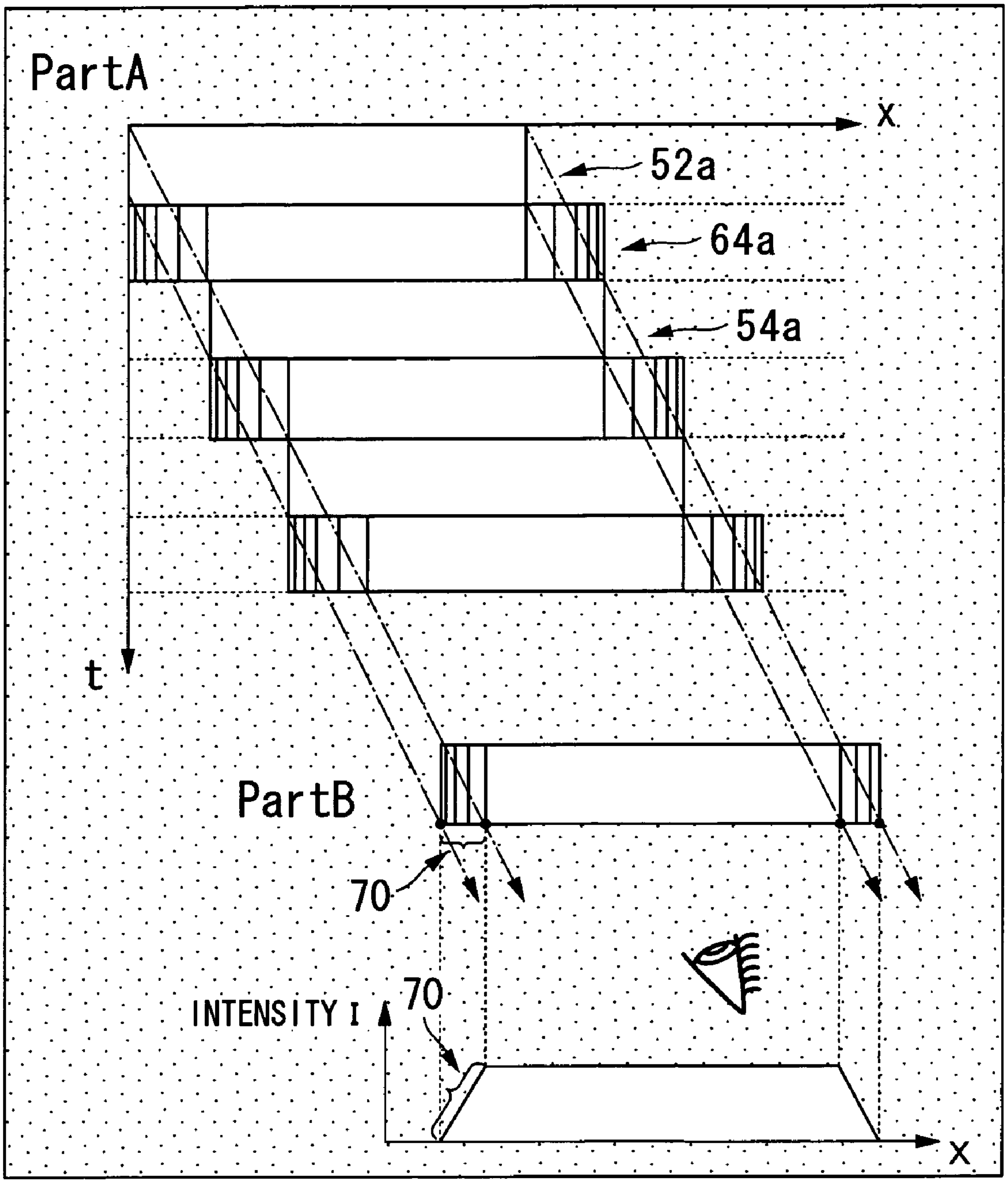
FIG. 8 shows an example of image display using the image display method according to the second embodiment of this invention.

FIG. 8 Part A shows an example of image display using the image display method of this embodiment, the vertical axis representing time. The continuous frames of input image signal 52, the generated image signal 64, and the continuous frames of input image signal 54 shown in FIG. 7 are used in respectively displaying a first image 52*a*, a second image 64*a*, and a third image 54*a*, shown in FIG. 8 Part A. The outline of the second image 64*a*, which corresponds to the generated image signal, is blurred in the direction which the object is moving in. In particular, the regions changing with the first image 52*a* and the third image 54*a* are entirely blurred.

Figure 16:
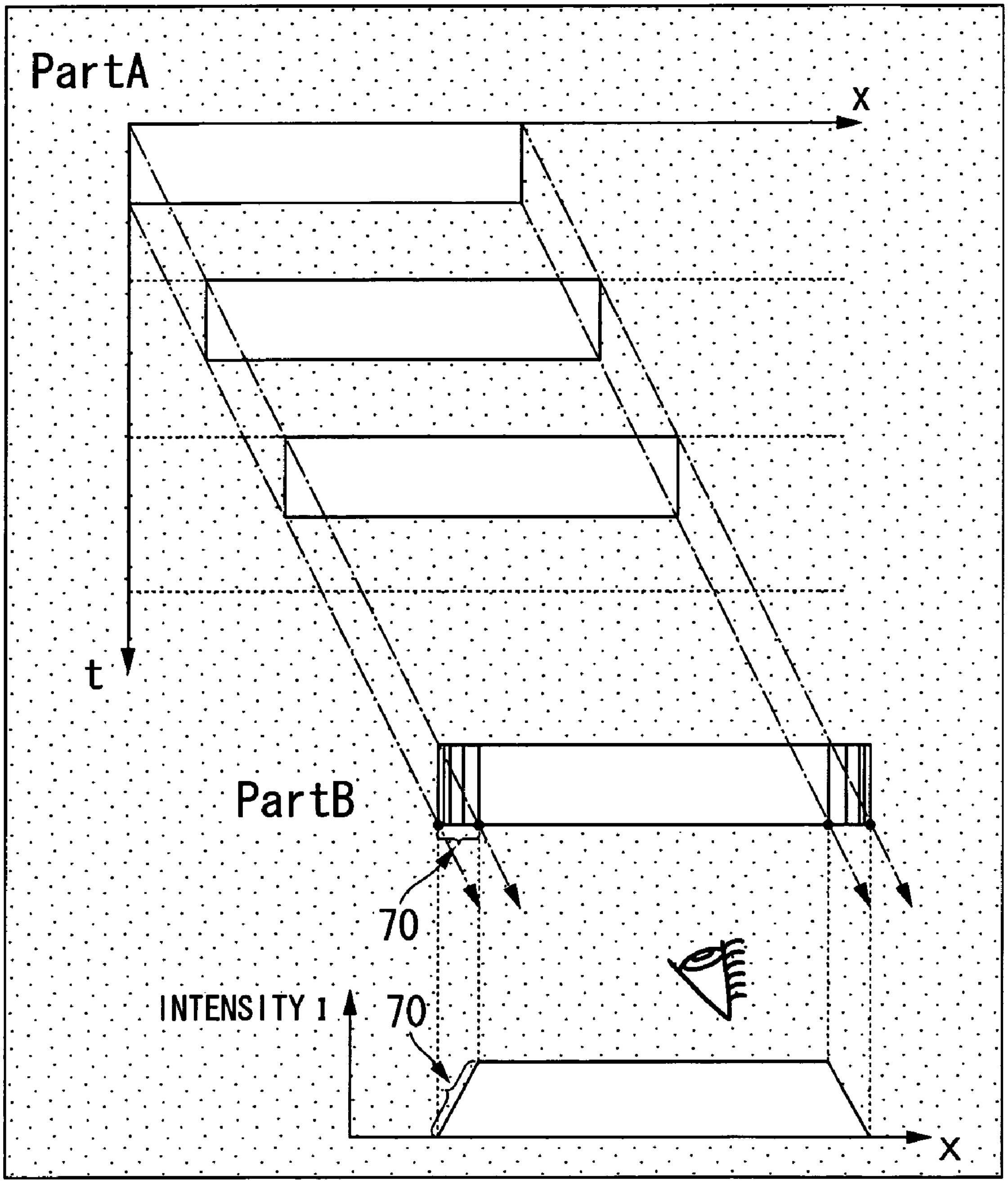
FIG. 16 shows an example of an intermittent image display.

As shown in FIG. 8 Part B, inserting a generated image signal with a blurred outline between the input images and displaying them in this way reduces the blur 70 of the outline of a moving object when it is tracked by the line of sight. The outline is unclear when not tracked by the line of sight. The visual characteristics achieved are therefore similar to those of the natural world. Since the image is displayed continuously, the image can be made brighter than when it is displayed intermittently as in FIG. 16.

As shown in FIG. 8 Part A, the same display as that in the second image 64*a* is displayed in the unchanged region with the first image 52*a* and the third image 54*a*. For example, the white display region which is common to the first image 52*a* and the third image 54*a* is also displayed in the second image 64*a*. The outline of the second image 64*a* is blurred throughout the entire region which changes with the first image 52*a* and the third image 54*a*.

Figure 17:
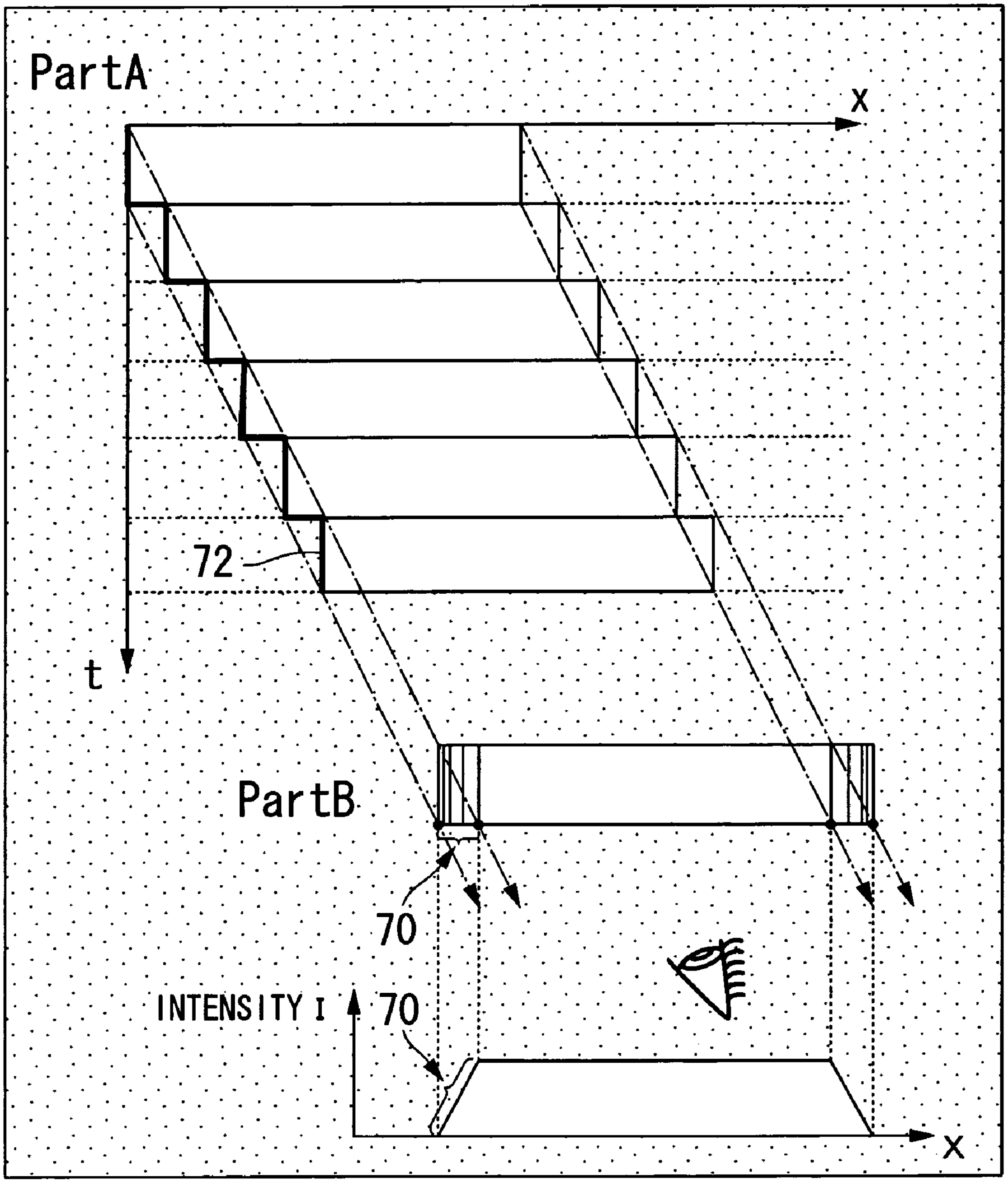
FIG. 17 shows an example of image display achieved by inserting a generated image signal between continuous frames of input image signals.

Consequently, the area of the white display in the second image 64*a* is the same as that of the first image 52*a* and the third image 54*a*. Therefore, the brightness of the image car be secured more reliably than when a generated image similar to the input image is inserted between the input images and displayed as in FIG. 17.

Moreover, in the image display method of this embodiment, the generated image signal can be generated by a simple algorithm. When displaying an image by the method of FIG. 17, where the generated image signal is generated by precisely capturing the movement of a moving object and calculating a motion vector or the like, an algorithm is needed to determine the destination of the moving object, increasing the load of the arithmetic processor. Furthermore, since an error in the generated image signal will cause flickering, it must be generated with high precision. It is therefore difficult to generate the generated image signal. In contrast in the image display method of this embodiment, the generated image signal can be generated by a simple algorithm using the continuous frames of input image signals, with no need for any kind of determination. High precision is not required when generating the generated image signal, since the outline of the moving image is blurred. Therefore, the generated image signal can be easily generated.

THIRD EMBODIMENT

Subsequently, a third embodiment of this invention will be explained using FIG. 9 through FIG. 11.

Figure 4:
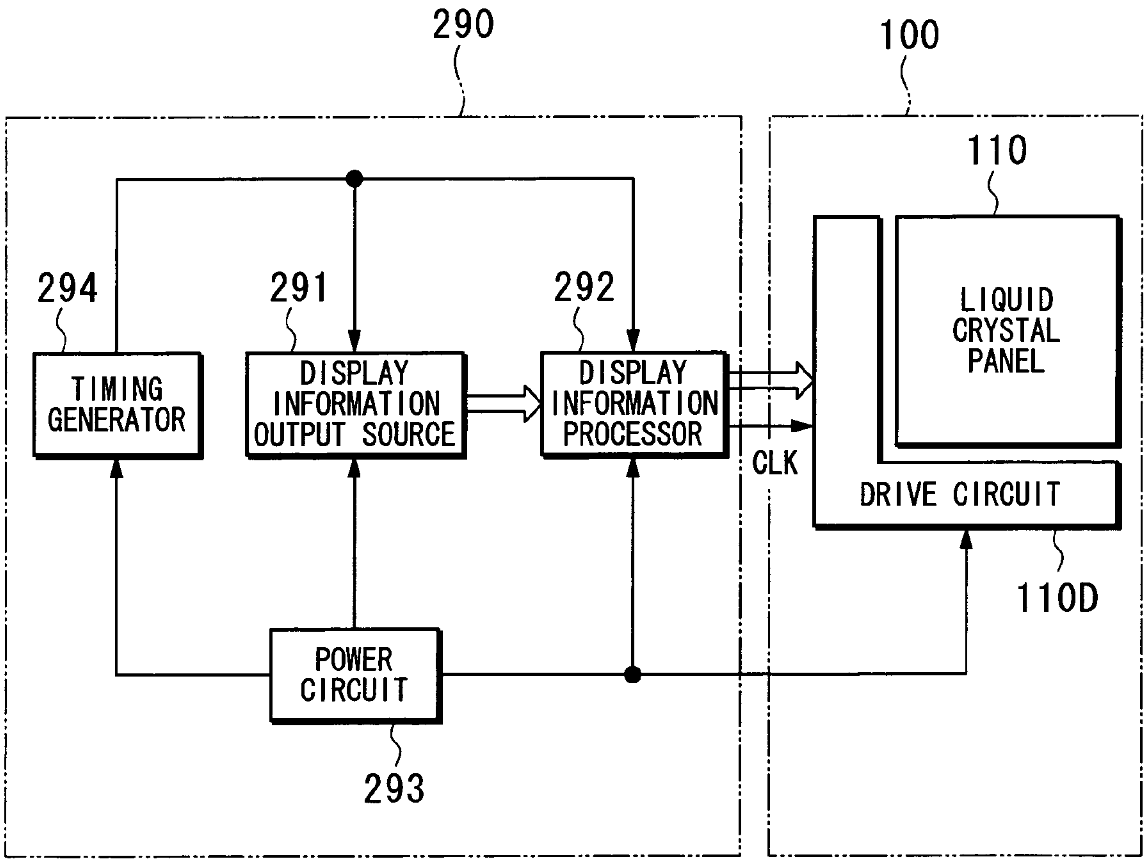
FIG. 4 is a block diagram showing an image display device according to a second embodiment of this invention.
Figure 9:
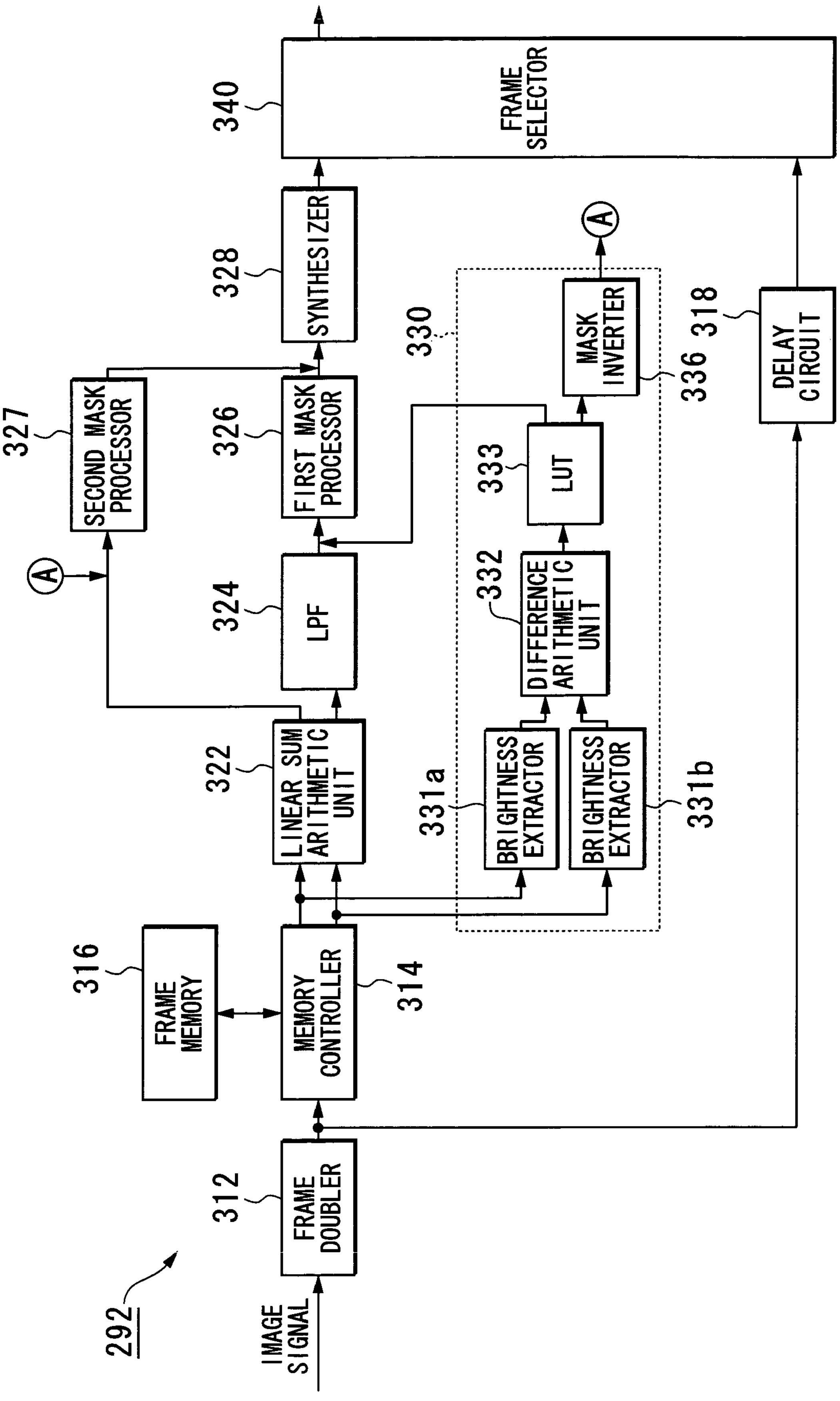
FIG. 9 is a block diagram showing a processor according to a third embodiment of this invention.

FIG. 9 is a block diagram showing a processor according to the third embodiment. FIG. 9 depicts only the parts of the processor 292 shown in FIG. 4 which are characteristic features of this invention. The image display method according to the third embodiment includes determining the application rate of a secondary intermediate image signal and the application rate of a primary intermediate image signal based on the difference between continuous frames of input image signals, and synthesizing the first and secondary intermediate image signals in accordance with their determined application rates, and generating a generated image signal. Repetitious explanation of parts which are the same as those in the second embodiment will be omitted.

Image Display Device

As shown in FIG. 9, a mask generator 330 is connected to the memory controller 314. The mask generator 330 generates a first mask stating the application rate of the secondary intermediate image signal in each image region, and a second mask stating the application rate of the primary intermediate image signal in each image region. As will be described below, the first mask processes the secondary intermediate image signal to generate a third intermediate image signal, and the second mask processes the primary intermediate image signal to generate a fourth intermediate image signal.

The mask processor includes brightness extractors 331*a* and 331*b* for the continuous frames of input image signals. The brightness extractors 331*a* and 331*b* extract only brightness information from the input image signals, which consist of brightness information and color information. This determines the application rate of the secondary intermediate image signal by uniformly calculating the difference between input image signals of different colors to be used in displaying a colored image.

This prevents the application rate of the secondary intermediate image signal from varying from color to color. In particular, if luminance information is extracted as brightness information, it is possible to simulate the human visual characteristic whereby the outline of an image is perceived by its luminance information, and thereby achieve a natural image display.

The difference arithmetic unit 332 is connected to the brightness extractors 331*a* and 331*b*. The difference arithmetic unit 332 calculates the difference in the brightness information of continuously input image signals. A look-up table (LUT) 333 is connected to the difference arithmetic unit 332.

Figure 10:
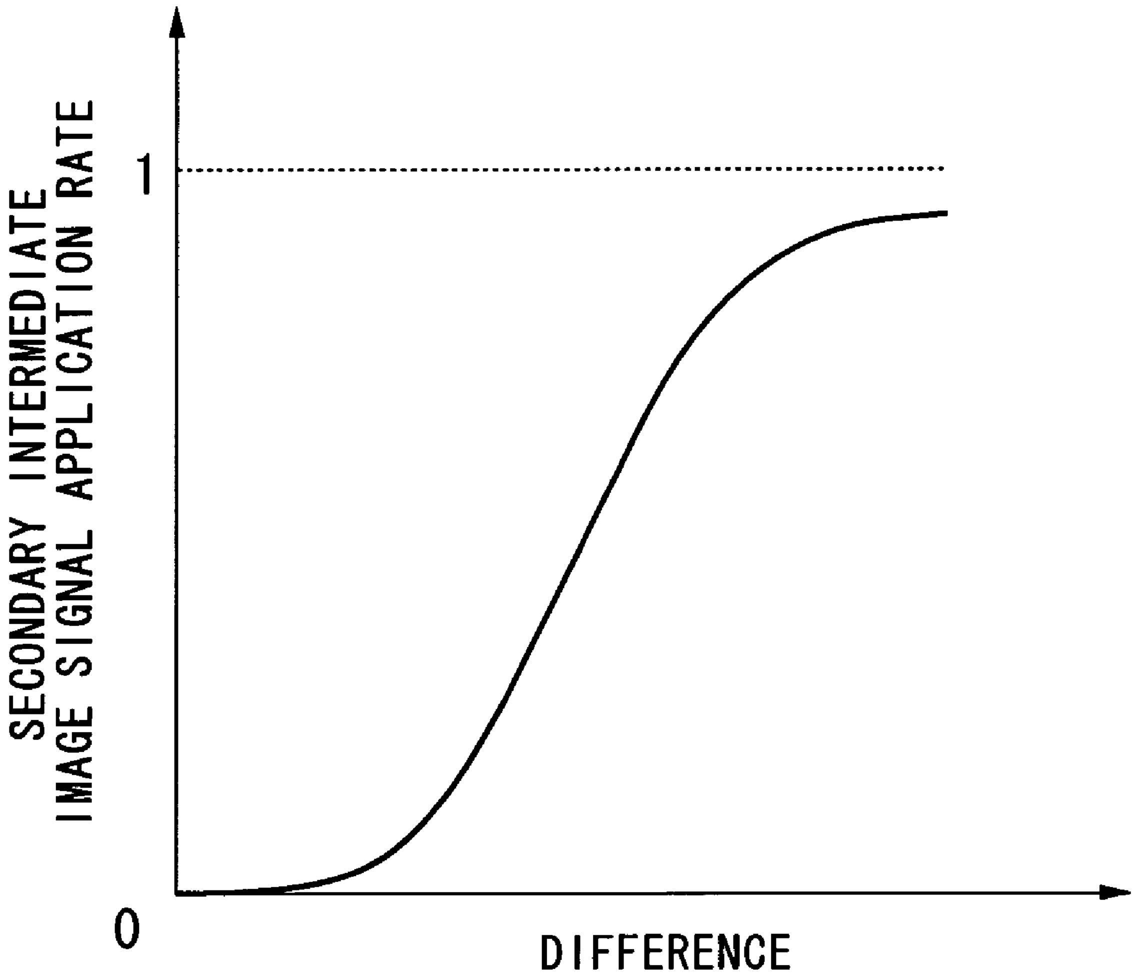
FIG. 10 is an explanatory diagram showing a LUT in a processor according to the third embodiment of this invention.

FIG. 10 is an explanatory diagram showing a LUT. The LUT 333 describes the relationship between the calculated difference and the application rate of the secondary intermediate image signal. Specifically, the larger the calculated difference the greater the application rate of the secondary intermediate image signal. The application rate of the secondary intermediate image signal in each image region is calculated based on this LUT, thereby creating the first mask.

Returning to FIG. 9, the LUT 333 connects to a mask inverter 336. The mask inverter 336 inverts the first mask which states the application rate of the secondary intermediate image signal, and generates a second mask which states the application rate of the primary intermediate image signal. That is, a second mask is generated for all the image regions on the basis that, if x represents the application rate of the secondary intermediate image signal in a given image region, the application rate of the first intermediate image signal in that region is $1-x$.

A first mask processor 326 is connected to the LPF 324 shown in FIG. 9. The first mask processor 326 uses the first mask generated by the mask generator 330 to process the secondary intermediate image signal generated via the LPF 324, thereby generating a third intermediate image signal. The linear sum arithmetic unit 322 of FIG. 9 is connected to a second mask processor 327. The second mask processor 327 uses the second mask generated by the mask generator 330 to process the primary intermediate image signal generated by the linear sum arithmetic unit 322, thereby generating a fourth intermediate image signal.

The synthesizer 328 connects to the first mask processor 326 and the second mask processor 327. The synthesizer 328 synthesizes the third and fourth intermediate image signals to generate a final generated image signal.

Image Display Method

Subsequently, an image display method which uses the image display device including the processors mentioned above will be explained.

Figure 11:
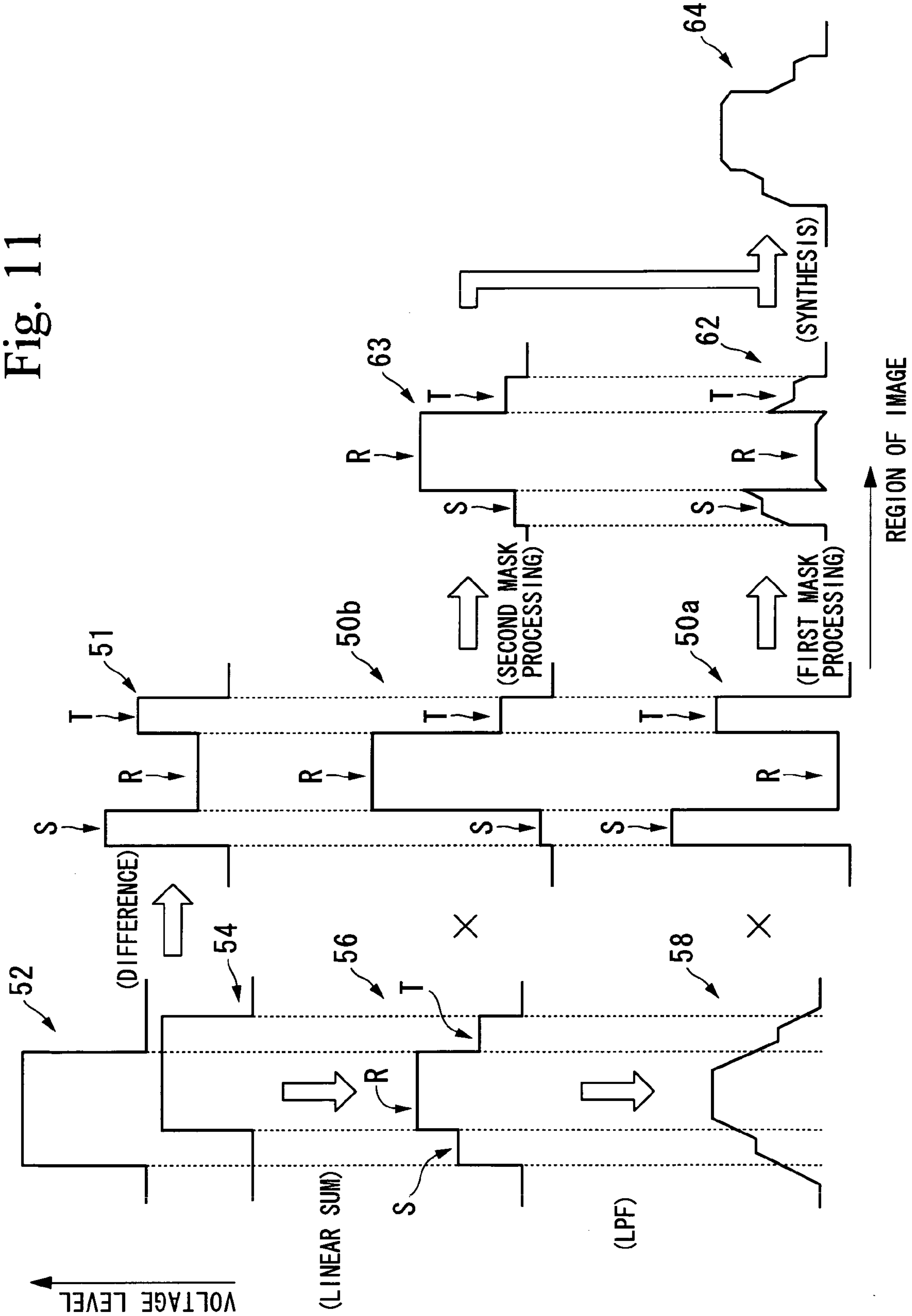
FIG. 11 is an explanatory diagram showing an image display method according to the third embodiment of this invention.

FIG. 11 is an explanatory diagram showing an image display method according to a third embodiment. FIG. 11 depicts the image signal generated in each step, the horizontal axis representing regions of the image and the vertical axis representing the voltage level of the signal. In the third embodiment, as in the preceding embodiment, the bright display (high level) region of the later input image signal 54 deviates to the right side of the bright display region of the earlier input image signal 52.

In addition, in the third embodiment, the signal level in the bright display region of the later input image signal 54 is lower than the signal level in the bright display region of the earlier input image signal 52. These input image signals display an object which moves from left to right on a dark screen while the brightness decreases.

Firstly, as in the second embodiment, the linear sum of the continuous frames of input image signals 52 and 54 is calculated and a primary intermediate image signal is generated. In the third embodiment, since the signal levels of the continuous frames of input image signals 52 and 54 are different, the signal level of the primary intermediate image signal 56 in the common bright display region R of the continuous frames of input image signals 52 and 54 (hereinafter simply "common bright display region") has an intermediate value between the values of these two signals.

Likewise, the signal levels in the surrounding regions S and T of the common bright display region of the primary intermediate image signal 56 (hereinafter simply "surrounding regions") differ greatly on the left and right sides of the common bright display region R.

As in the second embodiment, the first intermediate image signal 56 is passed through the LPF 324 to generate the second intermediate image signal 58 whose level change has been slowed.

In parallel with the generation of the first intermediate image signal 56 and the second intermediate image signal 58, the difference between the continuous frames of input image signals 52 and 54 is calculated. In the third embodiment, since the signal levels in the bright display regions of the continuous frames of input image signals 52 and 54 are different, the difference 51 in the common bright display region R is not zero. The differences 51 in the surrounding regions S and T of the common bright display region R differ greatly on the left and right sides of the common bright display region R.

Next, a first mask 50*a* is generated from the calculated difference 51. Specifically, the application rate of the secondary intermediate image signal in each image region is calculated by referring to the LUT shown in FIG. 10. By referring to this LUT, the application rate of the secondary intermediate image signal can be determined easily and uniformly.

In the LUT, the application rate of the secondary intermediate image signal increases considerably as the amount of the calculated difference increases, and decreases considerably as the amount of the calculated difference decreases. Accordingly, as shown in FIG. 11, in the common bright display region R where the difference 51 is small, the application rate of the secondary intermediate image signal in the first mask 50*a* is almost zero. In the surrounding regions S and T where the difference 51 is greater, the application rate of the secondary intermediate image signal in the first mask 50*a* is close to 1.

The second intermediate image signal 58 is processed by the first mask 50*a* and the third intermediate image signal 62 is generated. Since the application rate of the secondary intermediate image signal is almost zero in the common bright display region R of the first mask 50*a*, the image signal level in the common bright display region R of the third intermediate image signal 62 is extremely small. Since the application rate of the secondary intermediate image signal is close to 1 in the surrounding regions S and T of the first mask 50*a*, the secondary intermediate image signal with a slower level change is almost unaltered in the surrounding regions S and T of the third intermediate image signal 62.

The first mask 50*a* which states the application rate of the secondary intermediate image signal is inverted, generating a second mask 50*b* which states the application rate of the primary intermediate image signal. Specifically, the second mask 50*b* is generated for every image region on the basis that, if x represents the application rate of the secondary intermediate image signal in a given image region, the application rate of the first intermediate image signal in that region is $1-x$.

Consequently, the application rate of the primary intermediate image signal is close to 1 in the common bright display region R of the second mask 50*b*. In the surrounding regions S and T of the second mask 50*b*, the application rate of the primary intermediate image signal is close to zero.

Thus the second mask 50*b* can be easily generated by inverting the first mask 50*a*. Moreover, since the second mask is applied in the primary intermediate image signal as described subsequently, it is possible to generate a generated image signal having an intermediate signal level between those of the continuous frames of input image signals, achieving a natural image display.

The first intermediate image signal 56 is then processed by the second mask 50*b* to generate the fourth intermediate image signal 63. Since the application rate of the primary intermediate image signal is close to 1 in the common bright display region R of the second mask 50*b*, the level of the image signal in the common bright display region of the primary intermediate image signal is almost unaltered.

In the surrounding regions S and T of the second mask 50*b*, since the application rate of the primary intermediate image signal is close to zero, the level of the image signal in the secondary intermediate image signal of the fourth intermediate image signal 63 is also close to zero.

The third intermediate image signal 62 and the fourth intermediate image signal 63 are then synthesized to generate the final generated image signal 64. The generated image signal 64 is inserted between the continuous frames of input image signals 52 and 54 and the image is displayed. As mentioned above, in the third embodiment, the generated image signal 64 can be generated by a simple algorithm.

Since the level change has been slowed in the secondary intermediate image signal of the generated image signal 64, the displayed image has a blurred outline. If the image is displayed with this generated image having a blurred outline inserted between the input images, the blur of the outline can be reduced when the moving object is tracked by the line of sight. When not tracked by the line of sight, the outline appears unclear. As in the second embodiment, this obtains visual characteristics which are similar to those of the natural world.

In addition in the third embodiment, the generated image signal is generated after determining the application rate of the secondary intermediate image signal based on the difference between the continuous frames of input image signals. This configuration makes it possible to generate a generated image signal which continuously changes from a region of considerable difference to one of little difference. A natural image can thus be displayed.

When the signal level of a continuous still image signal varies only slightly due to noise and the like, the generated image signal is generated after reducing the application rate of the secondary intermediate image signal which has a reduced high-spatial frequency component and increasing the application rates of the input image signal and the primary intermediate image signal. This prevents considerable blurring in the outline of a still image and enables it to be displayed accurately.

While, in the third embodiment, the second mask is applied in the primary intermediate image signal to generate the fourth intermediate image signal, the second mask may be applied in an input image signal to generate the fourth intermediate image signal. In this case, either one of the continuous frames of input image signals can be applied in the input image signal. If the second mask is applied in the primary intermediate image signal, it is possible to generate a generated image signal whose signal level is between those of the continuous frames of input image signals. Thus, it is possible to obtain a natural image display.

FOURTH EMBODIMENT

Subsequently, a fourth embodiment of this invention will be explained with reference to FIG. 12.

Figure 12:
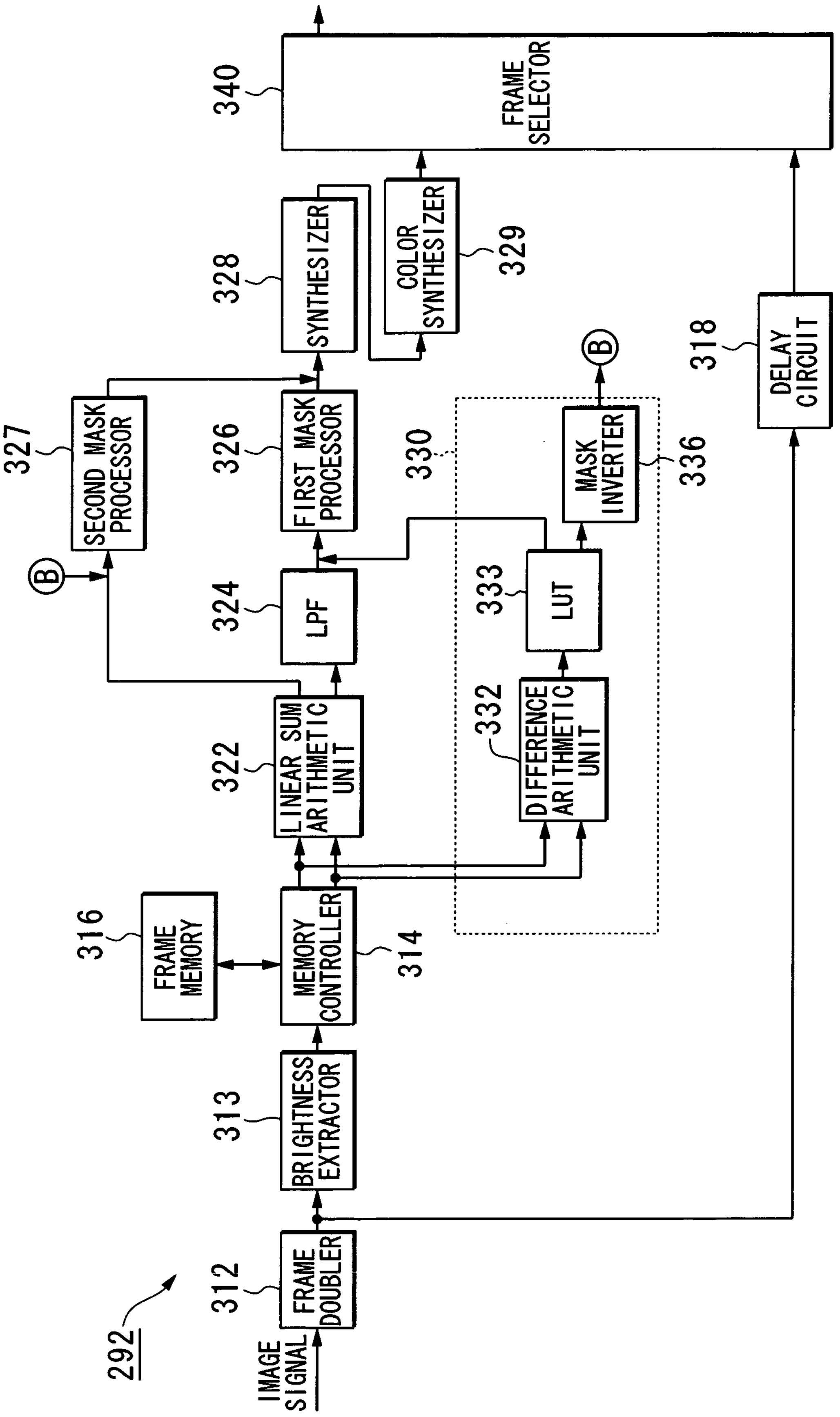
FIG. 12 is a block diagram showing a processor according to a fourth embodiment of this invention.

FIG. 12 is a block diagram showing a processor according to the fourth embodiment. FIG. 12 depicts only the parts of the display information processor 292 of FIG. 4 which are characteristic features of this invention. The image display method of the fourth embodiment differs from that of the third embodiment in that brightness information of the input image signals is extracted beforehand, brightness information for a generated image signal is generated based on the extracted brightness information of the input image signals, and the generated image signal is generated by synthesizing color information of the input image signals with the brightness information which was generated. Repetitious explanation of parts which are the same as those in the third embodiment will be omitted.

As shown in FIG. 12, in the fourth embodiment, a brightness extractor 313 is connected by the frame doubler 312 and the memory controller 314. The brightness extractor 313 extracts luminance information from the input image signals as brightness information. The mask generator 330 does not include a brightness extractor. A color synthesizer 329 is connected between the synthesizer 328 and the 329. The color synthesizer 329 synthesizes color information with the brightness information for the generated image signal which was generated by the synthesizer 328, thereby generating a final generated image signal.

In the third embodiment, although the mask generator extracts brightness information from the input image signals and creates the first mask and the like based on the difference in the brightness information, the intermediate image signals and the generated image signal are generated by processing the input image signals which still include the brightness information and the color information.

In contrast to the fourth embodiment, brightness information of the input image signals is extracted beforehand, brightness information for a generated image signal is generated based on the extracted brightness information of the input image signals, and the generated image signal is generated by synthesizing color information of the input image signals with the brightness information which was generated.

The first mask and the like are, of course, generated based on the difference between the brightness information. This configuration makes it possible to commoditize the generator (processor) of the brightness information of the generated image signal with regard to input image signals of different colors which are used for color image display, and reducing the size of the circuit. Therefore, the manufacturing cost can be reduced.

Projector

Figure 13:
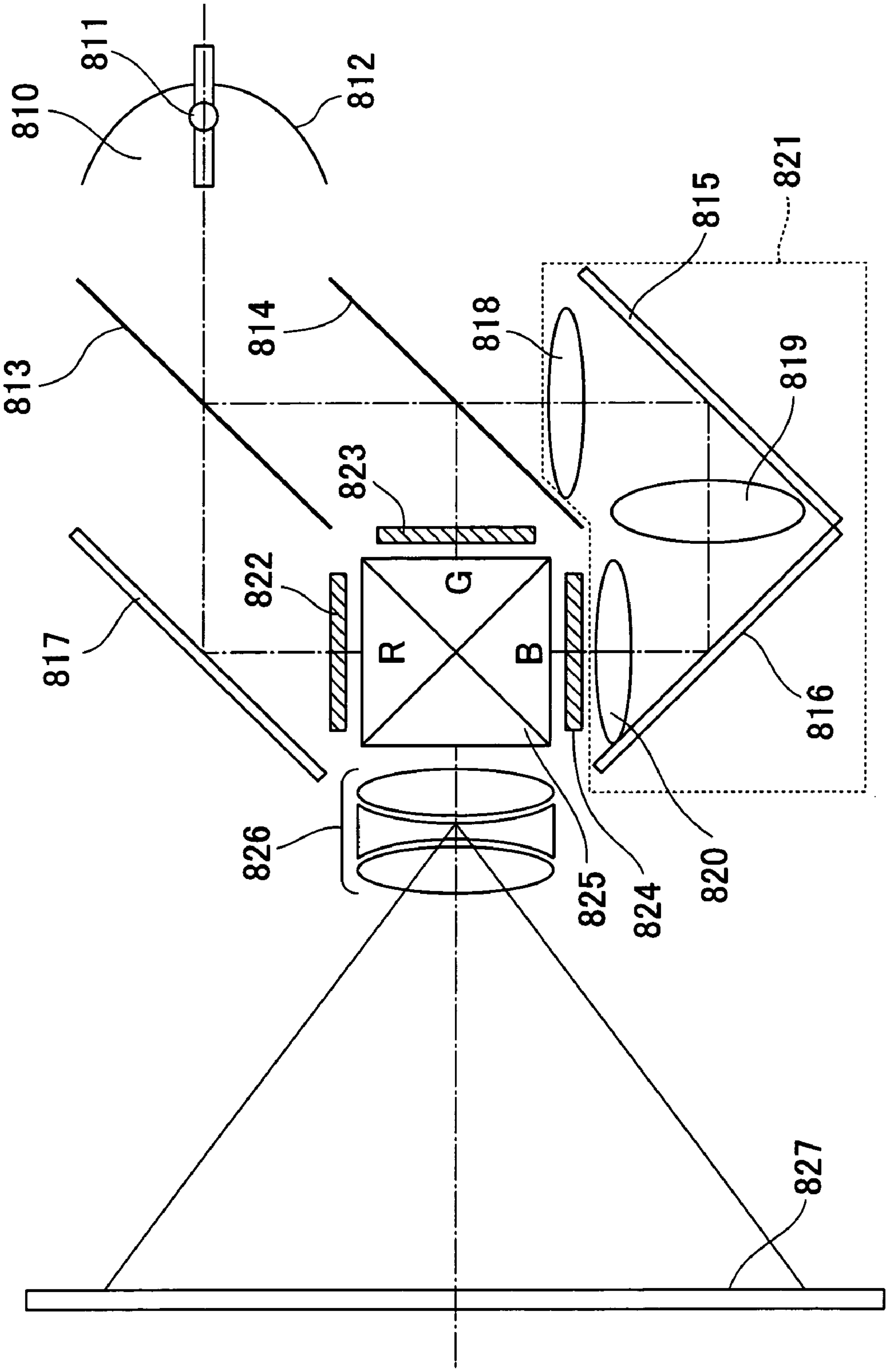
FIG. 13 is a schematic diagram showing the configuration of a projector according to this invention.
Figure 14:
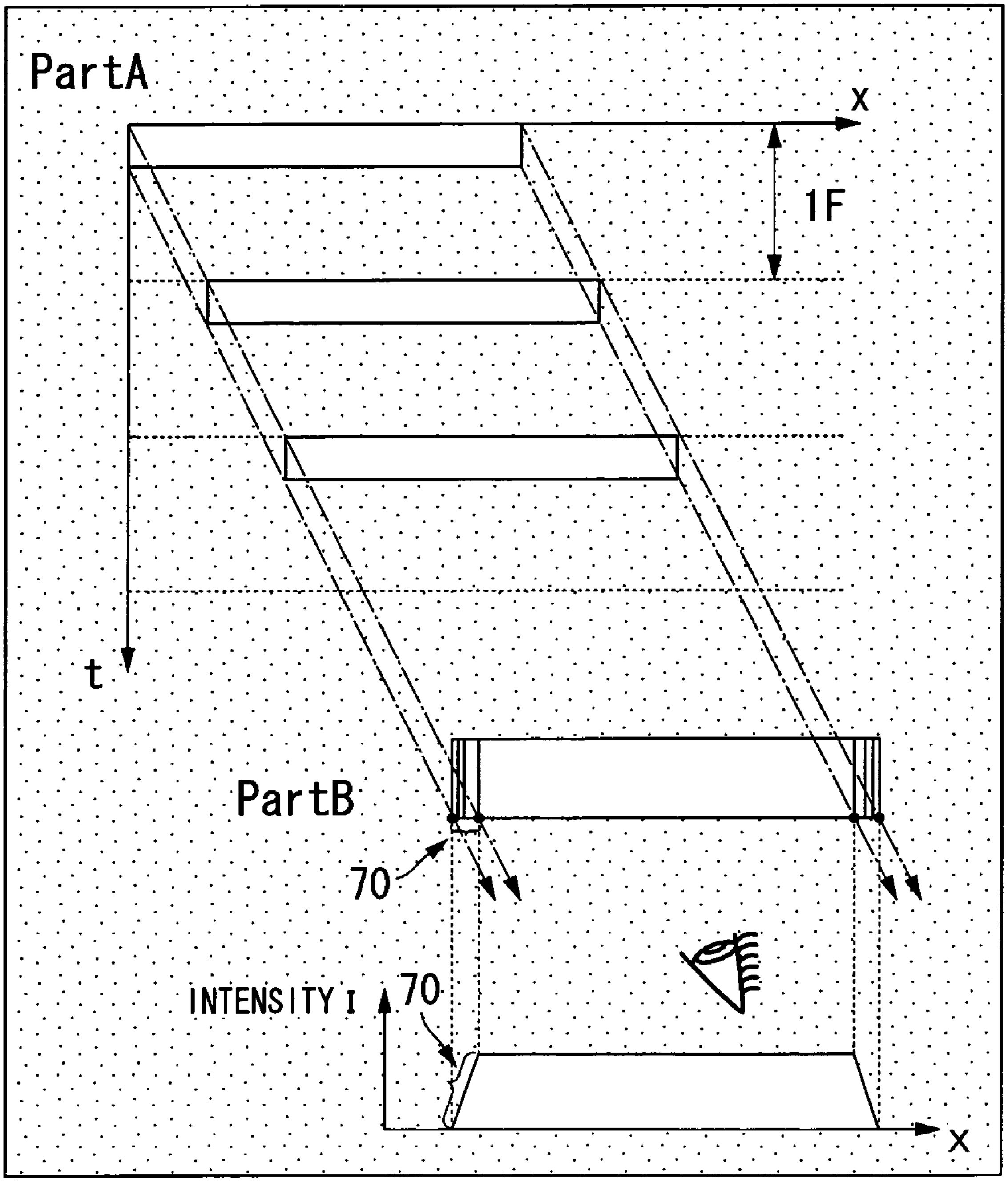
FIG. 14 shows an example of a momentary-type image display such as a CRT.
Figure 15:
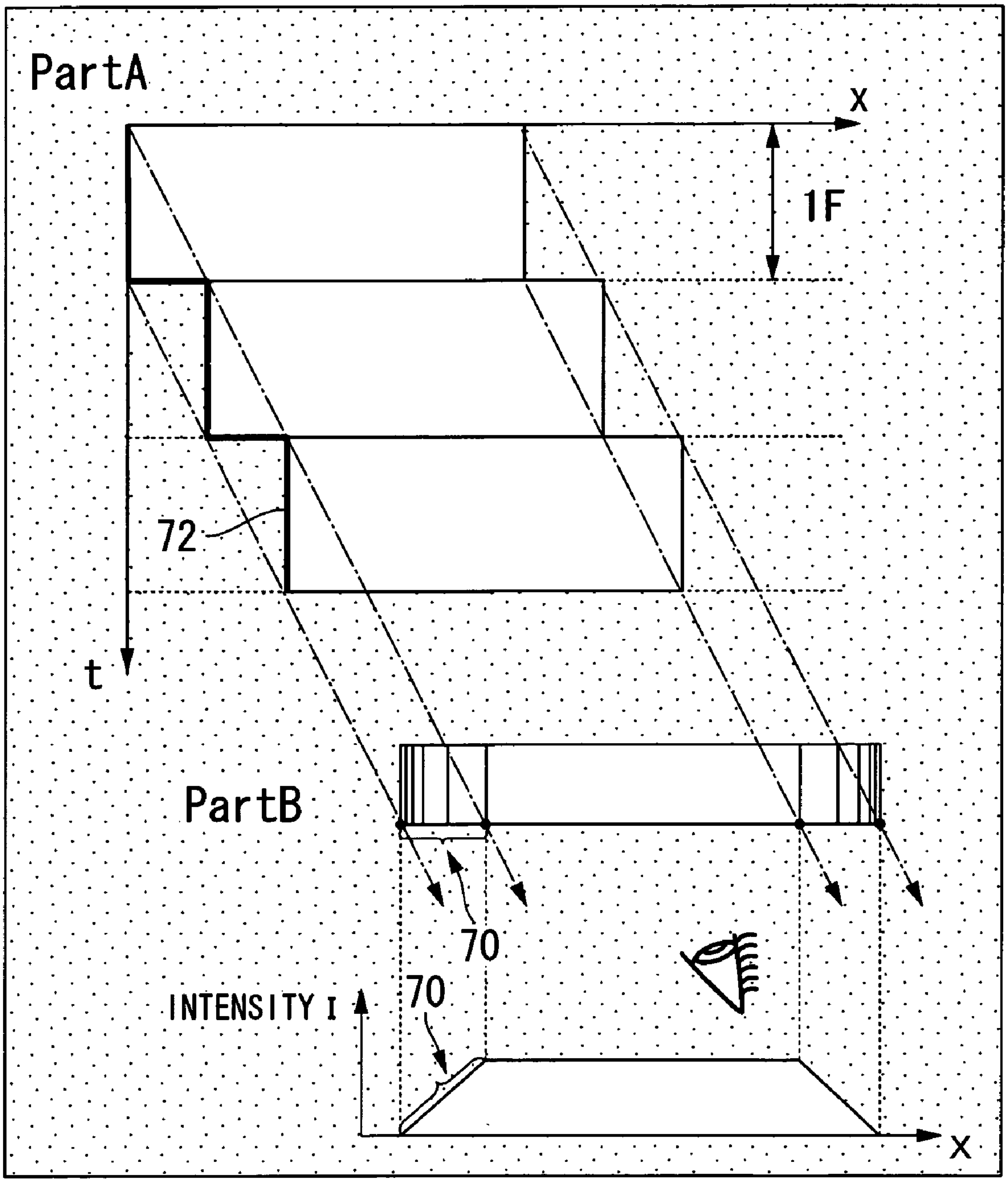
FIG. 15 shows an example of a continuous-type image display such as a liquid crystal.

Subsequently, a projector which includes the image display device of the embodiments described above will be explained with reference to FIG. 13. FIG. 13 is a schematic diagram showing the configuration of the main parts of a projector. This projector includes the liquid crystal panel 17 or the liquid crystal device 100 including the image display device of the above embodiments as light modulation units 822, 823, and 824.

In FIG. 13, reference numeral 810 represents a light source, reference numerals 813 and 814 represent dichroic mirrors, reference numerals 815, 816, and 817 represent reflecting mirrors, reference numeral 818 represents an incident lens, reference numeral 819 represents a relay lens, reference numeral 820 represents an emission lens, reference numerals 822, 823, and 824 represent light modulation units consisting of liquid crystal panels (liquid crystal devices), reference numeral 825 represents a cross dichroic prism, and reference numeral 826 represents a projection lens. The light source 810 includes a lamp 811 such as a metal halide lamp and a reflector 812 which reflects light from the lamp.

The dichroic mirror 813 transmits red light which is contained in white light from the light source 810 while reflecting blue light and green light. The transmitted red light is reflected by the reflecting mirror 817 and is incident upon the light modulation unit for red light 822. The green light reflected by the dichroic mirror 813 is reflected by the dichroic mirror 814 and is incident upon the light modulation unit for green light 823. The blue light reflected by the dichroic mirror 813 is transmitted through the dichroic mirror 814. A light-guiding unit 821 consists of a relay lens system including the incident lens 818, the relay lens 819, and the emission lens 820, and is provided in order to prevent light loss on a long optical path. The blue light passes via the light-guiding unit 821 and is incident upon the light modulation unit for blue light 824.

The light of three colors modulated by the light modulation units is incident upon the cross dichroic prism 825. The cross dichroic prism 825 is formed by affixing together four right-angled prisms, a dielectric laminated film which reflects red light and a dielectric laminated film which reflects blue light being arranged in an X-shape at the interfaces between them. These dielectric laminated films synthesize the three colors to generate light which expresses a color image. This synthesized light is projected onto a screen 827 by a projection optical system including the projection lens 826, and the image is enlarged for display.

Each of the light modulation units 822, 823, and 824 includes a liquid crystal panel (liquid crystal device) which is driven according to the image display method described in the above embodiment. This achieves visual characteristics which are similar to those of the natural world, and avoids reducing the luminance of the displayed image. It is therefore possible to provide a projector which projects a bright image with excellent display quality. Increase in the signal processing load is suppressed while reducing the blur of the displayed image.

Therefore, this projector can achieve excellent display characteristics.

In addition to liquid crystal panels, a digital micro-mirror device (DMD: registered trademark), a device using an LCOS (Liquid Crystal On Silicon) method, and so on, can be used as the light modulation units.

In addition to a projection-type display device such as the projector described above, the image display device and the image display method of this invention can also be applied in a direct-view-type display device. One example of a direct-view-type display device is an electro-optic device such as a liquid crystal display device. Other electro-optic devices include those having an electro-optic effect of changing the transmissivity of light by using an electrical field to change the refractive index of a substance, devices which convert electrical energy to light energy, and so on. In other words, the image display method of this invention can be applied not only in the transmission-type liquid crystal device mentioned above but also in a reflection-type liquid crystal device, a digital micro-mirror device (DMD: registered trademark), and so on. It can also be widely applied in organic electroluminescence (EL) devices, inorganic EL devices, plasma display devices, electrophoretic display devices, light-emitting devices such as display devices which use electron-emitting elements (e.g., field emission display and surface-conduction electron-emitter display), and so on.

A mobile telephone is a specific example of an electronic apparatus which includes this type of direct-view-type display device. Other examples include IC cards, video cameras, personal computers, head mount displays, facsimile machines equipped with a display function, a finder in a digital camera, portable televisions, DSP devices, PDAs, electronic notebooks, electric bulletin boards, and promotional displays, etc.

While preferred embodiments of the invention have been described and illustrated above, these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

For example, in the embodiments described above, the frame converter 11 doubles the frame frequency of the input image signal, thereby dividing one frame into two subframes. However, this is not to be considered as limitative of the invention, it being possible to divide one frame into three or more sub-frames by multiplying the frame frequency of the input image signal by an integer of three or more. Furthermore, it is not actually restrictive that the frame frequency be limited to being multiplied by an integer, and it is possible to increase the frame frequency of a system by, for example, 1.5 times.

What is claimed is:

1. An image display method comprising:

inputting an image signal to a frame converter;

multiplying a frame frequency of the image signal by the frame converter so that one frame is divided into a plurality of sub-frames including at least a first sub-frame and a second sub-frame;

outputting, from the frame converter, a first original signal that corresponds to the first sub-frame and a second original signal that is identical to the first original signal and corresponds to the second sub-frame;

reducing a high-spatial frequency component of the image signal used for image display in the first sub-frame;

increasing a high-spatial frequency component of the image signal used for image display in the second sub-frame in accordance with an amount of the reduction in the high-spatial frequency component of the first original signal; and displaying the first sub-frame based on the image signal in which the high-spatial frequency component of the first original signal has reduced and the second sub-frame based on the image signal in which the high-spatial frequency component has increased.

2. An image display method according to claim 1, wherein the high-spatial frequency component is reduced by processing the image signal used for image display in the predetermined sub-frame using a low-pass filter.

3. An image display device comprising:

a frame converter which divides one frame into a plurality of sub-frames including at least a first sub-frame and a second sub-frame by multiplying a frame frequency of an image signal that is input, and outputs a first original signal that corresponds to the first sub-frame and a second original signal that is identical to the first original signal and corresponds to the second sub-frame;

a high-spatial frequency component reducing unit which reduces a high-spatial frequency component of the image signal used for image display in the first sub-frame, and outputs the first sub-frame based on the image signal in which the high-spatial frequency component of the first original signal is reduced;

a high-spatial frequency component increasing unit which increases a high-spatial frequency component of the image signal used for image display in the second sub-frame in accordance with an amount of the reduction in the high-spatial frequency component of the first sub-frame by the high-spatial frequency component reducing unit; and a display device which displays the first sub-frame output from the high-spatial frequency component reducing unit, and the second sub-frame based on the image signal in which the high-spatial frequency component has increased.

4. An image display device according to claim 3, wherein a low-pass filter is used as the high-spatial frequency component reducing unit.

5. A projector including the image display device according to claim 3.

* * * * *